(12) United States Patent
Blandino et al.

(10) Patent No.: US 12,075,833 B2
(45) Date of Patent: Sep. 3, 2024

(54) AEROSOL GENERATING DEVICE

(71) Applicant: NICOVENTURES TRADING LIMITED, London (GB)

(72) Inventors: Thomas Paul Blandino, Madison, WI (US); Ashley John Sayed, London (GB); Luke James Warren, London (GB)

(73) Assignee: NICOVENTURES TRADING LIMITED, London (GB)

( * ) Notice: Subject to any disclaimer, the term of this patent is extended or adjusted under 35 U.S.C. 154(b) by 424 days.

(21) Appl. No.: 17/593,193

(22) PCT Filed: Mar. 9, 2020

(86) PCT No.: PCT/EP2020/056225
§ 371 (c)(1),
(2) Date: Sep. 10, 2021

(87) PCT Pub. No.: WO2020/182735
PCT Pub. Date: Sep. 17, 2020

(65) Prior Publication Data
US 2022/0183378 A1  Jun. 16, 2022

Related U.S. Application Data

(60) Provisional application No. 62/816,340, filed on Mar. 11, 2019.

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/80* (2020.01); *A24F 40/90* (2020.01); *H02J 7/007* (2013.01); *H05B 6/105* (2013.01)

(58) Field of Classification Search
CPC ........ A24F 40/465; A24F 40/20; A24F 40/80; A24F 40/90; A24F 40/50; H02J 7/007;
(Continued)

(56) References Cited

U.S. PATENT DOCUMENTS 10,856,575 B2 *  12/2020  Gill ...................... A24F 40/465
11,240,885 B2 *   2/2022  Fursa .................... H05B 6/108
(Continued)

FOREIGN PATENT DOCUMENTS

CN        105595437 A    5/2016
KR      20130001202 U    2/2013

OTHER PUBLICATIONS

International Search Report and Written Opinion of International Application No. PCT/EP2020/056225, mailed Jun. 9, 2020, 11 pages.

*Primary Examiner* — Alexander Gilman
(74) *Attorney, Agent, or Firm* — Burr & Forman LLP

(57) ABSTRACT

An aerosol generating device includes an induction heating circuit for inductively heating a susceptor arrangement to heat an aerosol generating material to thereby generate an aerosol. The device is configured such that during operation a level of electromagnetic radiation emitted by the device is: less than 40 dBμV/m over a frequency range of 30 MHz to 225 MHz and/or less than 47 dBμV/m over a frequency range of 235 MHz to 1 GHz, and/or less than 70 dBμV/m over a frequency range of 1 GHz to 3 GHz, and/or less than 74 dBμV/m over a frequency range of 3 GHz to 6 GHz.

28 Claims, 14 Drawing Sheets

(51) Int. Cl.
*A24F 40/80* (2020.01)
*A24F 40/90* (2020.01)
*H02J 7/00* (2006.01)
*H05B 6/10* (2006.01)

(58) Field of Classification Search
CPC . H02J 7/007184; H05B 6/105; H05B 1/0202; H05B 6/06; H05B 6/36
USPC .......................................................... 131/329
See application file for complete search history.

(56) References Cited

U.S. PATENT DOCUMENTS

| | | | | |
|---|---|---|---|---|
| 11,324,259 B2* | 5/2022 | Courbat | ................ | H05B 6/108 |
| 11,363,840 B2* | 6/2022 | Courbat | ................... | A24F 40/48 |
| 11,375,753 B2* | 7/2022 | Fursa | ................... | A24F 40/465 |
| 11,433,193 B2* | 9/2022 | Rogan | ................. | A61M 11/042 |
| 11,452,313 B2* | 9/2022 | Kaufman | ............... | A24F 40/465 |
| 11,452,826 B2* | 9/2022 | Leadley | ............... | A61M 15/06 |
| 11,470,883 B2* | 10/2022 | Kaufman | ............... | H05B 6/365 |
| 11,510,291 B2* | 11/2022 | Horrod | ................. | A61M 15/06 |
| 2015/0320116 A1* | 11/2015 | Bleloch | ................ | A61M 11/042 |
| | | | | 219/628 |
| 2017/0055580 A1* | 3/2017 | Blandino | ................ | H05B 6/36 |
| 2017/0055583 A1* | 3/2017 | Blandino | ................ | H05B 6/108 |
| 2017/0079326 A1* | 3/2017 | Mironov | ............... | H05B 6/108 |
| 2017/0112191 A1* | 4/2017 | Sur | ........................ | A24F 40/50 |
| 2017/0119054 A1* | 5/2017 | Zinovik | .................. | H05B 6/02 |
| 2017/0196269 A1* | 7/2017 | Bernauer | ............... | A24F 40/40 |
| 2017/0231276 A1* | 8/2017 | Mironov | .............. | H05B 1/0244 |
| | | | | 131/328 |
| 2017/0303586 A1* | 10/2017 | Sur | ........................ | A24F 40/46 |
| 2017/0360102 A1* | 12/2017 | Li | ........................ | A24F 40/465 |
| 2018/0007969 A1* | 1/2018 | Sur | ........................ | A24F 40/50 |
| 2018/0184713 A1* | 7/2018 | Mironov | ................ | A24F 40/30 |
| 2019/0090541 A1* | 3/2019 | Bernauer | ................ | H05B 6/06 |
| 2019/0191783 A1* | 6/2019 | Courbat | .................. | A24D 1/20 |
| 2019/0200677 A1* | 7/2019 | Chong | ...................... | A24C 5/01 |
| 2020/0022416 A1* | 1/2020 | Alarcon | .................. | A24F 40/57 |
| 2020/0046020 A1* | 2/2020 | Cross | ...................... | A24F 40/40 |
| 2020/0245682 A1* | 8/2020 | Reevell | ................ | A24F 40/465 |

* cited by examiner

AEROSOL GENERATING DEVICE

PRIORITY CLAIM

The present application is a National Phase entry of PCT Application No. PCT/EP2020/056225, filed Mar. 9, 2020, which claims priority from U.S. Provisional Application No. 62/816,340, filed Mar. 11, 2019, each of which is hereby fully incorporated herein by reference.

TECHNICAL FIELD

The present disclosure relates to an aerosol generating device.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to a first aspect of the present disclosure there is provided an aerosol generating device comprising: an induction heating circuit for inductively heating a susceptor arrangement to heat an aerosol generating material to thereby generate an aerosol; wherein the device is configured such that during operation a level of electromagnetic radiation emitted by the device is: less than 40 dBµV/m over a frequency range of 30 MHz to 225 MHz and/or less than 47 dBµV/m over a frequency range of 235 MHz to 1 GHz, and/or less than 70 dBµV/m over a frequency range of 1 GHz to 3 GHz, and/or less than 74 dBµV/m over a frequency range of 3 GHz to 6 GHz.

The device may be configured such that during operation the level of electromagnetic radiation emitted due to the operation of the device is less than 40 dBµV/m over a frequency range of 30 MHz to 225 MHz and less than 47 dBµV/m over a frequency range of 235 MHz to 1 GHz.

The device may be configured such that during operation to charge the device and/or during operation to discharge the device the level of electromagnetic radiation emitted due to the operation of the device is less than 40 dBµV/m over a frequency range of 30 MHz to 225 MHz and/or less than 47 dBµV/m over a frequency range of 235 MHz to 1 GHz, and/or less than 70 dBµV/m over a frequency range of 1 GHz to 3 GHz, and/or less than 74 dBµV/m over a frequency range of 3 GHz to 6 GHz.

The level of radiation emitted by the device may be a level of emitted radiation as measured in both a vertical plane and in a horizontal plane.

The level of electromagnetic radiation emitted by the device may be a level of electromagnetic radiation as measured using a testing setup for measuring levels of emitted electromagnetic radiation, wherein optionally, the level of emitted radiation emitted by the device is a level determined by measuring peak or quasi-peak levels of radiation emitted by the device.

The device may comprise the susceptor arrangement and during operation the aerosol generating material may be received by the device such that the susceptor arrangement is arranged to heat the aerosol generating material.

The device may be a tobacco heating device configured to during operation heat but not burn tobacco material to generate an aerosol therefrom.

The device may be a handheld device.

The device may comprise a magnetic shield member configured to extend at least partially around the inductive heating circuit or the susceptor arrangement.

The induction heating circuit may comprise an inductive element configured to generate a varying magnetic field for heating the susceptor arrangement, and the magnetic shield member may be configured to extend at least partially around the inductive element.

The device may comprise a receptacle configured to receive during operation the aerosol generating material to be heated by the susceptor arrangement, and the inductive element may be an inductor coil extending around the receptacle.

The receptacle may be defined by the susceptor arrangement.

The magnetic shield member may surround the inductive element and the magnetic shield member may be at least partially bonded to itself.

The device may comprise a charging apparatus configured to control charging of a battery of the device from a power source external to the device, and the charging apparatus may be configured such that, when operating to manage charging of the device, peak levels in electromagnetic radiation emitted by the device due to operation of the charging apparatus are less than 40 dBµV/m over a frequency range of 30 MHz to 225 MHz and/or less than 47 dBµV/m over a frequency range of 235 MHz to 1 GHz, and/or less than 70 dBµV/m over a frequency range of 1 GHz to 3 GHz, and/or less than 74 dBµV/m over a frequency range of 3 GHz to 6 GHz.

The charging apparatus may be configured to perform switching operations during charging, and the charging apparatus may comprise a snubber circuit for limiting a rate of change of voltage during the switching operations of the charging apparatus.

The charging apparatus may comprise: an input section configured for connecting to the external power source to receive power therefrom to charge the device; an output section connected to an output inductor; and a charge management controller, connected between the input section and the output section and configured to receive power from the input section and control the current supplied to the output section.

The snubber circuit may be located in the output section of the charging apparatus.

The input section of the charging apparatus may comprise an input inductor for filtering high frequency signals reaching the charge management controller.

The device may be configured such that during operation to heat an aerosolizable material a level of electromagnetic radiation emitted by the device over a frequency range of 30 MHz to 1 GHz is less than around 35 dBµV/m.

The device may be configured such that during operation to heat an aerosolizable material a level of electromagnetic radiation emitted by the device over a frequency range of 30 MHz to 400 MHz is less than around 20 dBµV/m.

The device may be configured such that during operation to charge the device a level of electromagnetic radiation emitted by the device over a frequency range of 300 MHz to 1 GHz is less than around 37.5 dBµV/m.

The device may be configured such that during operation to charge the device a level of electromagnetic radiation emitted by the device over a frequency range of 30 MHz to 500 MHz is less than around 35 dBμV/m.

The device may be configured such that an average emitted radiation level for the device during operation over a frequency range of 1 GHz to 3 GHz is less than around 50 dBμV/m and/or an average emitted radiation level for the device during operation over a frequency range of 3 GHz to 6 GHz is less than around 54 dBμV/m.

According to a second aspect of the present disclosure there is provided a system comprising an aerosol generating device according to the first aspect and a charging cable for providing charge from an external power source to charge the device, wherein the system is configured such that during operation to charge the device a level of electromagnetic radiation emitted by the system is less than 40 dBμV/m over a frequency range of 30 MHz to 225 MHz and/or less than 47 dBμV/m over a frequency range of 235 MHz to 1 GHz, and/or less than 70 dBμV/m over a frequency range of 1 GHz to 3 GHz, and/or less than 74 dBμV/m over a frequency range of 3 GHz to 6 GHz.

The system may be configured such that during operation to charge the device a level of electromagnetic radiation emitted by the system over a frequency range of 300 MHz to 1 GHz is less than around 37.5 dBμV/m.

The system may be configured such that during operation to charge the device a level of conducted electromagnetic emissions on the charging cable due to operation of the device is: less than around 66 dBμV over a frequency range of 150 kHz to 500 kHz; and/or less than around 56 dBμV at around 500 kHz; and/or less than around 56 dBμV over a frequency range of 500 kHz to 5 MHz; and/or less than around 60 dBμV over a frequency range of 5 MHz to 30 MHz.

According to a third aspect of the present disclosure there is provided an aerosol generating system comprising an aerosol generating device according to the first aspect and an article containing an aerosolizable material, wherein the system is configured such that during operation to generate an aerosol from the aerosolizable material a level of electromagnetic radiation emitted by the system is less than 40 dBμV/m over a frequency range of 30 MHz to 225 MHz and/or less than 47 dBμV/m over a frequency range of 235 MHz to 1 GHz, and/or less than 70 dBμV/m over a frequency range of 1 GHz to 3 GHz, and/or less than 74 dBμV/m over a frequency range of 3 GHz to 6 GHz.

The system may be configured such that when during operation to generate an aerosol from the aerosolizable material a level of electromagnetic radiation emitted by the system is less than around 35 dBμV/m over a frequency range of 30 MHz to 500 MHz.

The system may be configured such that during operation to generate an aerosol from the aerosolizable material a level of electromagnetic radiation emitted by the system over a frequency range of 30 MHz to 400 MHz is less than around 20 dBμV/m.

Further features and advantages of the disclosure will become apparent from the following description of embodiments of the disclosure, given by way of example only, which is made with reference to the accompanying drawings.

DETAILED DESCRIPTION

Figure 1:
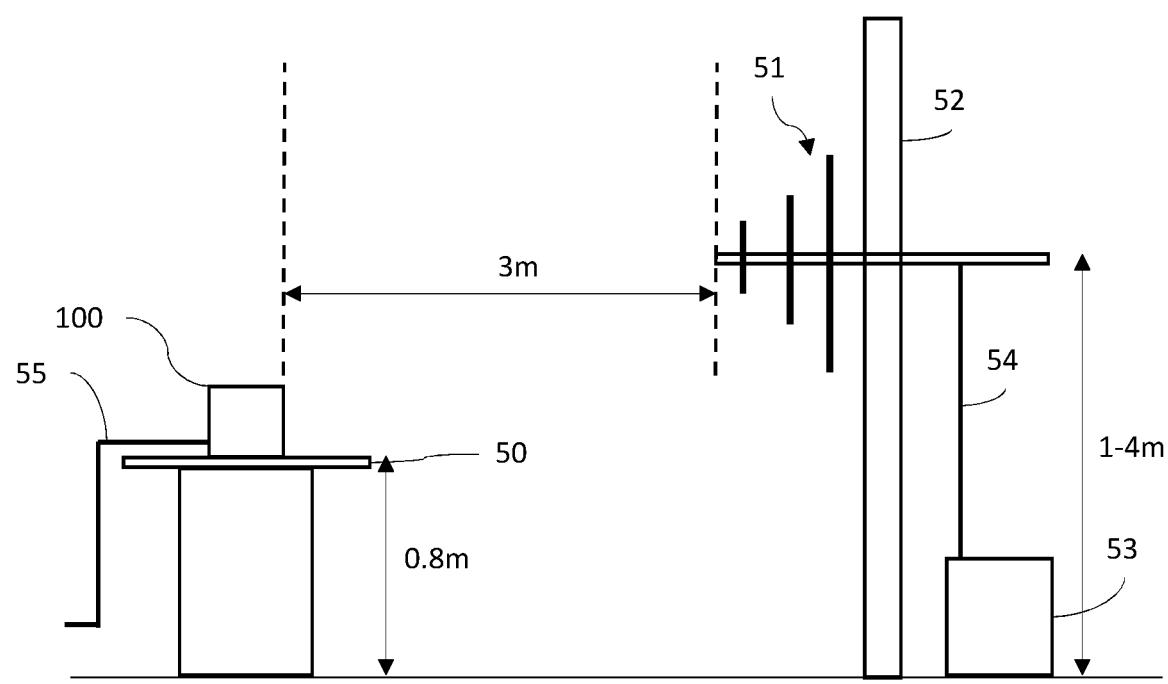
FIG. 1 shows a schematic representation of a setup for measuring levels of electromagnetic radiation emitted by an example aerosol generating system.

As used herein, the term "aerosol generating material" includes materials that provide volatilized components upon heating, typically in the form of an aerosol. Aerosol generating material includes any tobacco-containing material and may, for example, include one or more of tobacco, tobacco derivatives, expanded tobacco, reconstituted tobacco or tobacco substitutes. Aerosol generating material also may include other, non-tobacco, products, which, depending on the product, may or may not contain nicotine. Aerosol generating material may for example be in the form of a solid, a liquid, a gel, a wax or the like. Aerosol generating material may for example also be a combination or a blend of materials. Aerosol generating material may also be known as "smokable material".

Apparatus is known that heats aerosol generating material to volatilize at least one component of the aerosol generating material, typically to form an aerosol which can be inhaled, without burning or combusting the aerosol generating material. Such apparatus is sometimes described as an "aerosol generating device", an "aerosol provision device", a "heat-not-burn device", a "tobacco heating product device" or a "tobacco heating device" or similar. Similarly, there are also so-called e-cigarette devices, which typically vaporize an aerosol generating material in the form of a liquid, which may or may not contain nicotine. The aerosol generating material may be in the form of or be provided as part of a rod, cartridge or cassette or the like which can be inserted into the apparatus. A heater for heating and volatilizing the aerosol generating material may be provided as a "permanent" part of the apparatus. The device may be a handheld device, intended to be held in a user's hand when in use to generate an aerosol to be inhaled by the user.

An aerosol generating device can receive an article comprising aerosol generating material for heating. An "article" in this context is a component that includes or contains in use the aerosol generating material, which is heated to volatilize the aerosol generating material, and optionally other components in use. A user may insert the article into the aerosol generating device before it is heated to produce an aerosol, which the user subsequently inhales. The article may be, for example, of a predetermined or specific size that is configured to be placed within a heating chamber of the device which is sized to receive the article.

Examples of the present disclosure relate to an aerosol generating device which comprises an induction heating circuit for inductively heating a susceptor arrangement. In use, the susceptor arrangement is arranged when inductively heated by the inductive heating circuit to heat an aerosol generating material to thereby generate an aerosol.

The susceptor can be heated by penetrating the susceptor with a varying magnetic field, produced by an inductor coil, or in some examples by another type of inductive element. The heated susceptor in turn heats the aerosol generating material.

The inductor coil may in use extend around the susceptor. The susceptor may, in an example, form a part of the aerosol generating device. In one example the susceptor defines a receptacle for receiving the aerosol generating material to be heated. For example, the susceptor may be substantially tubular (i.e. hollow) and may be configured to receive the aerosol generating material within a tubular receptacle defined by the susceptor. In one example, the aerosol generating material is tubular or cylindrical in shape, and may be known as a "tobacco stick", for example, the aerosolizable material may comprise tobacco formed in a specific shape which is then coated, or wrapped in one or more other materials, such as paper or foil. Alternatively, the susceptor may not be a component of the device, but may be attached to, or contained within an article introduced into the device.

An inductive heating circuit emits electromagnetic radiation in use as a varying current flows in the circuit. For example, electromagnetic radiation is emitted when a varying current flow within the inductive element to heat the susceptor arrangement. The device may also emit electromagnetic radiation during charging of the device. For example, during charging, electromagnetic radiation may be produced at least due to changing voltages produced in a charging circuit of the device.

The device may be configured to such that a level of emitted electromagnetic radiation over ranges of frequencies, in units of dBµV/m, are within predetermined levels. For example the aerosol generating device may be configured such that during operation a level of electromagnetic radiation emitted by the device over a frequency range of 30 MHz to 225 MHz is less than 40 dBµV/m and/or such that a level of electromagnetic radiation emitted by the device over a frequency range of 235 MHz to 1 GHz is less than 47 dBµV/m. The device may be configured such that during operation a level of electromagnetic radiation emitted by the device is less than 70 dBµV/m over a frequency range of 1 GHz to 3 GHz, and/or less than 74 dBµV/m over a frequency range of 3 GHz to 6 GHz.

In some examples an average emitted radiation level for the device during operation over a frequency range of 1 GHz to 3 GHz may be less than around 50 dBµV/m and/or an average emitted radiation level for the device during operation over a frequency range of 3 GHz to 6 GHz may be less than around 54 dBµV/m.

Levels of electromagnetic radiation emitted by the device may be measured by an electromagnetic emissions test. In one example, the electromagnetic emissions test measures electromagnetic emissions from the device over the relevant range of frequencies when the device is in operation. The test may be performed when the device is operating in different ways, for example, while charging, or while discharging e.g. during normal use to produce an aerosol. The device may be configured such that the level of emitted radiation emitted by the device is below the above-described levels while the device is charging and while the device is discharging. It should be noted that, in some examples, the level of electromagnetic radiation emitted by the device during operation over one or more particular frequency ranges, such as the frequency range of 30 MHz to 225 MHz and/or 235 MHz to 1 GHz, or any other frequency ranges described herein, may be substantially zero.

In one example, in an electromagnetic emissions test, the level of electromagnetic radiation emitted by the device is measured by use of an antenna located at a standardized position with respect to the device. The device is caused to operate, e.g. be charged or discharged, while the antenna measures electromagnetic radiation emitted from the device over a range of frequencies of interest.

Furthermore, the device may be configured to have a particular level of immunity to electromagnetic radiation. In a test of the immunity of the device to electromagnetic radiation, electromagnetic radiation may be emitted from an antenna and incident on the device. The device may be tested to determine if it continues to operate as intended while and after electromagnetic radiation is incident upon it. The setup for a test of immunity to electromagnetic radiation may be the same as that for an electromagnetic emission test. That is, in some examples the same antenna and standardized distances between the antenna and device may be used. In an example, a test of immunity to electromagnetic radiation may subject the device to electric fields of strength 3V/m varying at a frequency of 80 MHz to 1 GHz and evaluate any effect of this radiation on the operability of the device.

In some examples, the device may be configured to meet one or more predetermined levels for conducted emissions over a particular frequency range. For example, a level of conducted noise on a power cable supplying power to charge the device may be limited to a predetermined level. Such levels of conducted emissions may act to protect broadcast and telecommunication services used in the vicinity of the device. In an example, over a frequency range of 150 kHz to 30 MHz, the device may be configured such that a level of conducted electromagnetic emissions is less than around 66 dBµV. In examples, at 150 kHz to 500 kHz, the device may be configured such that a level of conducted electromagnetic emissions is less than around 66 dBµV, wherein at around 150 kHz the device is configured such that a level of conducted electromagnetic emissions is less than around 66 dBµV and at around 500 kHz a level of conducted electromagnetic emissions is less than around 56 dBµV. Over a frequency range of 500 kHz to 5 MHz, the device may be configured such that a level of conducted electromagnetic emissions is less than around 56 dBµV. Over a frequency range of 5 MHz to 30 MHz, the device may be configured such that a level of conducted electromagnetic emissions is less than around 60 dBµV. In examples, levels for conducted emissions may be determined by measuring quasi-peak levels which are measurable by a methodology which will be well understood.

In order to provide the device with levels of electromagnetic emissions, and in some examples electromagnetic immunity, as described above, the inventors have provided features of the device which reduce the level of emitted radiation from the device over the relevant frequency range and may also provide immunity to electromagnetic radiation incident on the device. Certain features may also shield components of the device and thus provide a level of immunity to incident electromagnetic radiation. For example, in order to block/absorb electromagnetic radiation emitted by components of the device the device may comprise a magnetic shield member. For example, the magnetic shield member may extend at least partially around the inductive element to shield other nearby electrical devices (as well as other electrical components of the aerosol generating device) from electromagnetic radiation generated by the inductive element. Where the inductive element is a coil, the magnetic shield may extend around the coil and the shield may be at least partially bonded to itself to secure it in place around the coil.

The magnetic shield member may comprise one or more layers/sheets of ferrite material to mitigate the effects of the electromagnetic radiation emitted by components of the device. Furthermore, the magnetic shield may act to shield components of the device from incident electromagnetic radiation and thus provide a level of immunity to electromagnetic radiation incident on the device.

Often ferrite material may be adhered to an inner surface of a device's housing/cover, however this requires a large quantity of ferrite material to adequately contain the electromagnetic radiation. This material can be relatively heavy, bulky and expensive, so it is desirable to reduce the amount used.

Some examples herein provide a more effective arrangement of a magnetic shield member within an aerosol generating device. Accordingly, in some examples the device comprises a magnetic shield member in contact with, and extending at least partially around, the inductor coil. The magnetic shield member comprises material, such as ferrite material, which absorbs/blocks electromagnetic radiation. By being arranged closer to the inductor coil, a reduced quantity of ferrite material is needed. It has been found that in some circumstances, the amount of material used can be reduced by up to 30% while providing an effective level of electromagnetic shielding.

The inductor coil may extend around the susceptor/receptacle in a helical fashion. The susceptor may define a longitudinal axis, such that the magnetic shield member extends around the longitudinal axis in an azimuthal direction, therefore forming a full or partial tube-like structure.

The magnetic shield member may comprise a magnetic shielding layer, such as a ferrite layer. A ferrite is a ferrimagnetic material, meaning that it can be magnetized and/or attracted to a magnet. In some examples the magnetic shielding layer is magnetized.

The aerosol generating device may comprise two or more inductor coils. For example, a first inductor coil may extend around a first portion the receptacle/susceptor, and a second inductor coil may extend around a second portion of the receptacle/susceptor. The first and second inductor coils may be arranged adjacent to each other in a direction along the longitudinal axis of the receptacle/susceptor. In such a device, the magnetic shield member may be in contact with, and extend at least partially around, the first and second inductor coils.

In some arrangements, the magnetic shield member may be bonded to the inductor coil by an adhesive layer. The adhesive layer holds the magnetic shield member in place, thereby ensuring adequate shielding from the electromagnetic radiation. Adhesive may be applied to the inductor coil, and the magnetic shield member may be brought into contact with the adhesive. Alternatively, the magnetic shield member may comprise the adhesive layer, and therefore be self-adhesive. For example, the magnetic shield member may comprise a magnetic shielding layer and an adhesive layer. The adhesive layer may be formed on an inner surface of the magnetic shield member (i.e. the surface which is arranged closest to the inductor coil). This can make it more efficient and effective to assemble the device. For example, the magnetic shield member can be applied directly to the inductor coil without first applying adhesive on to the inductor coil.

The magnetic shield member may be rolled around the inductor coil and be at least partially bonded to itself. Such an arrangement provides a more protective/enclosed shield from the electromagnetic radiation because the magnetic shield member is partially or fully sealed along its length. For example, a first edge of the magnetic shield member may overlap with a second edge of the magnetic shield member such that the magnetic shield member is bonded/adhered to itself in the overlapping region. Thus, the magnetic shield member may be formed from a sheet which is rolled into a tube. The bonding may be provided by the adhesive layer of the magnetic shield member for example.

The magnetic shield member may comprise at least one magnetic shielding layer and at least one laminate layer. This may be in addition to, or instead of, the adhesive layer. It has been found that the ferrite material (i.e. the magnetic shielding layer) can begin to crumble over time as a result of repeated heating and cooling within the aerosol generating device. The crumbling material can become loose and rattle within the device. The loose material may damage or affect other components of the device. By including a laminate layer (such as a layer of film), the magnetic shielding layer is less likely to crumble and become loose.

The laminate layer may be arranged towards an outer surface of the magnetic shield member. For example, it may be arranged radially outwards from the magnetic shielding layer. In one example, the laminate layer forms the outer surface of the magnetic shield member. However, in other examples there may be another layer which forms the outer surface. Here, the outer surface is the surface furthest away from the inductor coil. The laminate layer may be adhered to the magnetic shielding layer via adhesive, or it may be self-bonded to the magnetic shielding layer.

In one example, the laminate layer comprises a plastics material. The laminate layer may be a plastic film, for example. In a particular example, the plastic is Polyethylene terephthalate, PET.

The magnetic shield member may be formed from a sheet, and comprise a notch on the sheet, wherein the notch is configured to receive a section of wire forming the inductor coil. The section of wire may include an end of the inductor coil, for example. The inclusion of one or more notches allow the magnetic shield member to better conform to the inductor coil. The notches/cut-outs mean that the sheet can more easily be wrapped around the inductor coils while also ensuring a greater shielding effect. A notch is an indentation made at an edge of the sheet.

The sheet may be a square/rectangular sheet, with one or more notches "cut out". For example, the rectangular sheet may undergo a process of "notching" where material is removed. Alternatively, the sheet may be manufactured with the notches pre-formed.

The aerosol generating device may further comprise a second inductor coil adjacent to the inductor coil, and the sheet may comprise a second notch formed on the sheet. The second notch is configured to receive a section of wire forming the second inductor coil. The inclusion of additional notches allows the magnetic shield member to better conform to the two inductor coils.

In a particular example, the notch is a first notch and may be formed at a first edge of the sheet, and the second notch may be formed at a second edge of the sheet. Having the notches formed on different edges can make it easier to apply the magnetic shield member to the inductor coils. For example, during assembly, the first notch may be aligned with the first inductor coil before being wrapped around the inductor coils where the second notch receives the second inductor coil.

The first notch may be offset from the second notch in a direction along a longitudinal axis defined by the receptacle/susceptor. This can make it easier to assemble the device because of the offset of the notches. For example, the notches ensure that the sheet can only be wrapped around the coil in the correct way.

As mentioned, a notch is an indentation made at an edge of the sheet. These allow the sheet to be wrapped around the inductor coil(s) after they have been assembled and connected to a printed circuit board, for example. In another embodiment, the notches may be replaced by through holes/apertures, and ends of the inductor coils may be received in the apertures. Such an arrangement may provide greater shielding when compared to the notches, but the magnetic shield member would need to be wrapped around the inductor coil(s) before the ends of the inductor coils(s) are connected to a printed circuit board, for example.

In examples the device comprises a rechargeable power source, such as a battery, which is charged via a socket. The socket may accept a charging cable which supplies power to charge the power source. Power may be supplied, for example, from an electrical mains supply, or from an external source of stored power, such as a battery pack. The device may emit electromagnetic radiation while charging. For example, during charging, switching in a charging circuit may cause spikes in emitted electromagnetic radiation to be emitted by the device. The device is configured such that the emitted radiation, including said spikes during a charging operation, are within the above-described levels.

In examples, the device comprises a charging circuit for managing charging of the battery. In some examples, the charging management circuit may also provide management of power to the various electrical components of the device. For example, the charging circuit may operate as a switch-mode charger to provide a desired voltage to the battery for charging. The charging circuit in examples comprises a charge management device for performing the switching operations to enable the charging circuit to operate as a switch-mode charger. An input section of the charging circuit in examples is connected between the external power source and the charge management device while an output section of the charging circuit is connected between the charge management device and the battery, or between the charge management device and components of the device which are not part of the charging circuit.

The charging circuit in examples is configured such that any electromagnetic radiation emitted by the device due to the operation of the charging circuit is within levels described above. For example, the charging circuit may comprise components which act to limit the levels of electromagnetic radiation emitted during charging. In particular, the charging circuit may comprise features which limit the levels of spikes in electromagnetic radiation due to switching operations during charging. In one example, said features may comprise a snubber circuit configured to limit the rate of change of voltage between points in the charging circuit during said switching operations. A snubber circuit in one example comprises a resistor and a capacitor connected in series and connected between a point in the charging circuit and ground. The values of the resistance and the capacitance of snubber circuit may be chosen such that the rate of change of voltage during switching operations is effectively reduced, that is, voltage spikes due to switching operations are effectively "snubbed". The values of the resistance and capacitance of the snubber circuit/s may be dependent on any or all of the operating frequency of the charging circuit, the input voltage, or the output voltage.

The point in the charging circuit at which a snubber circuit is connected may also be chosen to effectively reduce voltage spikes. In examples, the output section of the charging circuit comprises an output inductor and the snubber circuit is connected between one end of the output inductor and ground.

In examples, the input section of the charging circuit is configured to limit the level of electromagnetic radiation emitted by charging operations. In examples, the input section comprises an input capacitor and the position and capacitance value of the input capacitor may be chosen to perform the function of an input capacitor in a switch-mode charging circuit while limiting emitted electromagnetic radiation to a particular level. In some examples the input section comprises one or more inductors. The number of any such inductors and the properties of the inductors, such as inductance and DC resistance, may be chosen to limit levels of emitted electromagnetic radiation.

In examples, the layout of the printed circuit board comprising the charging circuit, and in examples, other electrical components of the device, are configured to limit the levels of electromagnetic radiation emitted by the device.

FIG. 1 shows a schematic representation of an example setup for measuring electromagnetic radiation levels emitted by an aerosol generating device 100. In FIG. 1, the device 100 is located on a turn-table 50 located 0.8 m above the ground. The turn-table 50 is able to rotate 360° and allows rotation of the device to allow the maximum emission level to be measured. An antenna 51 is mounted on an antenna tower 52 and the antenna 51 is positioned 3 m away, measured horizontally, from the device 100. The antenna tower 52 is movable from a distance of 1 m to 4 m above the ground to allow the maximum emission level from the device 100 to be measured, in a method of "maximization" which will be well understood. In one example the antenna 51 is a BiLog ultrawideband antenna. A test receiver 53 is connected to the antenna 51 via an electrical cable 54 such that the test receiver 53 is configured to receive electrical signals from the antenna 51. In example, the device 100 and other equipment shown in FIG. 1 may be located in an insulated chamber. In FIG. 1, a charging cable 55 is shown for supplying power from an external power source (not shown) such that the device 100 can be tested during a charging operation of the device 100. In examples, the charging cable 55 comprises a YJC010 W-0502000J power supply unit (PSU) configured to be connected to the external power source. When the device 100 is tested during discharging, e.g. during operation to generate an aerosol, the charging cable 55 is typically not present.

In some examples, a setup such as is shown in FIG. 1 may be used in testing the device 100 for immunity to electromagnetic radiation. In one example of such a test, the antenna 51 may be caused to emit electromagnetic radiation of frequency 80 MHz to 1 GHz and field strength 3V/m. The functioning of the device 100 may be tested to determine whether there is any degradation of performance or loss of function due to the incident electromagnetic radiation.

Figure 2:
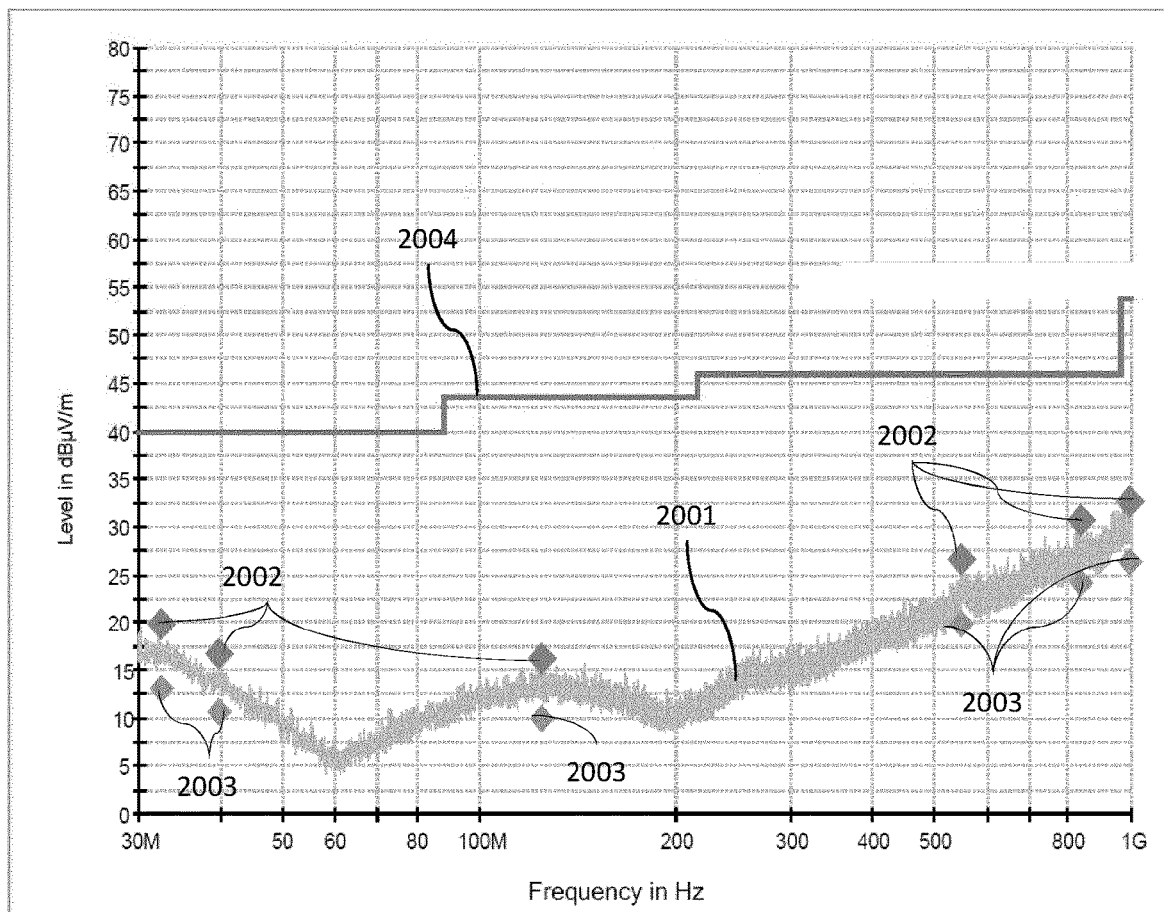
FIG. 2 shows a plot of measured levels of electromagnetic radiation from an example aerosol generating system during operation.
Figure 3:
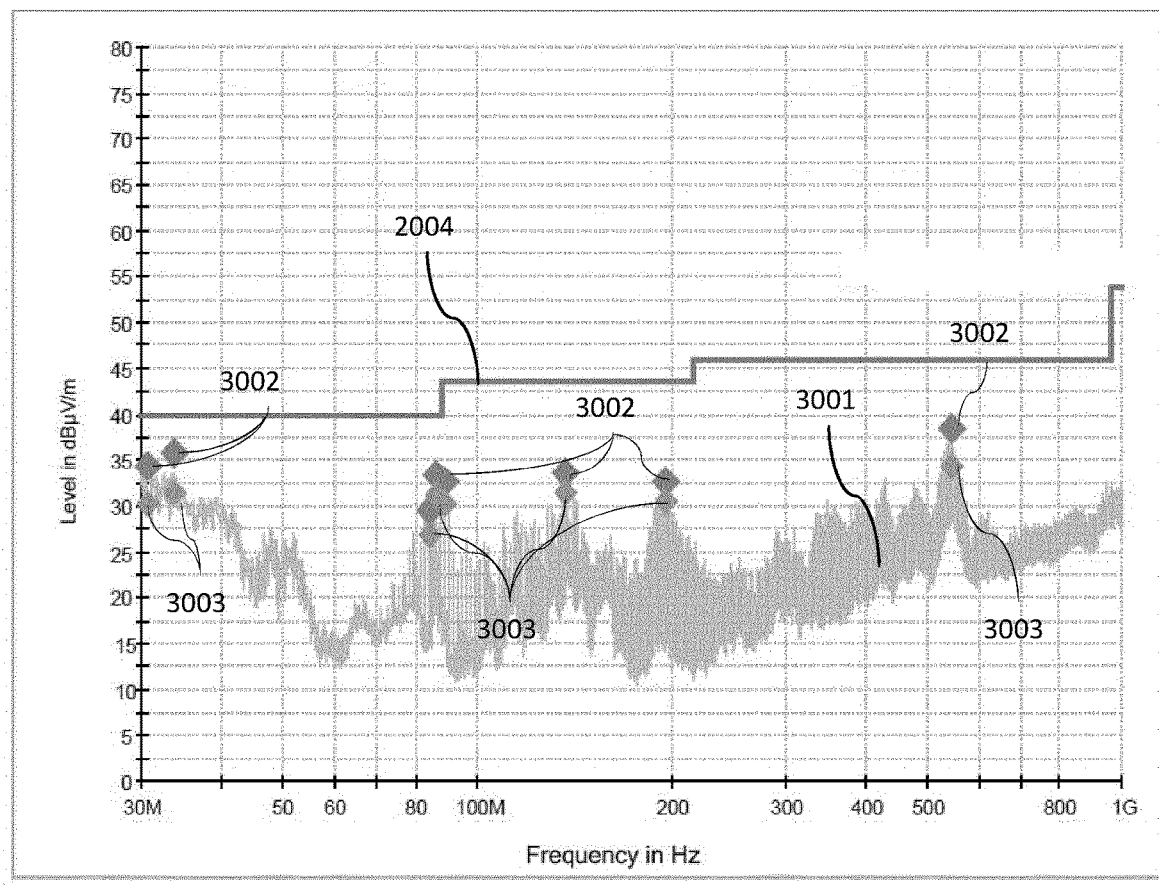
FIG. 3 shows another plot of measured levels of electromagnetic radiation from an example aerosol generating system during operation.

FIG. 2 shows a plot of levels of electromagnetic radiation emitted by the example device 100 with an example test setup as described with reference to FIG. 1. FIG. 2 displays results from the device 100 during discharging, e.g. during use to generate an aerosol from an aerosol generating material contained in an article received by the device. A plot 2001 shows the measured level of radiation emitted by the device 100, in dBμV/m against frequency in Hz over a frequency range of 30 Hz to 1 GHz. In this example, the plot 2001 is generated from combined measurements in a horizontal plane and a vertical plane and may be referred to as a combined horizontal and vertical max hold peak detector preview scan. A first plurality of markers 2002 above the plot 2001 represent maximized peak detectors measured during a particular reference methodology and are included for reference only. A second plurality of markers 2003 below the plot 2001 are maximized quasi-peak detectors which may be compared with reference levels of emitted radiation over particular frequency ranges to define a level of electromagnetic radiation emitted by the device 100, in a methodology which will be well understood. In examples, an average level of emitted radiation over particular frequency bands may also be determined, by methods which will be well understood. FIG. 2 and FIG. 3 also include a reference line 2004 represents, for reference only, reference levels of radiation emissions of: 40 dBμV/m over a frequency range of 30 MHz to 88 MHz; 43.5 dBμV/m over a frequency range of 88 MHz to 216 MHz; 46 dBμV/m over a frequency range of 216 MHz to 960 MHz; and 54 dBμV/m over a frequency range of 960 MHz to 1 GHz. In some examples, measured levels of radiation emissions by an example device may be compared against such reference levels.

It can be seen from FIG. 2 that the plot 2001 showing levels emitted radiation while the device 100 is discharging remains well below 40 dBμV/m over a frequency range of 30 MHz to 225 MHz and well below 47 dBμV/m over a frequency range of 235 MHz to 1 GHz. This can be seen to be true for the plot 2001, the peak markers 2002, and for the quasi-peak markers 2003. Furthermore, the plot 2001 remains below around 20 dBμV/m between a frequency of 30 MHz and around 400 MHz. The plot 2001 remains below around 32.5 dBμV/m between the entire frequency range of 30 MHz to 1 GHz.

FIG. 3 shows a plot 3001 of test results obtained according to equivalent methods to that described for FIG. 2. The plot 3001 of FIG. 3 is a plot of levels of emitted radiation from the device 100 during charging. In the same manner as described for FIG. 2, a first plurality of markers 3002 represent maximized peak detectors and a second plurality of markers 3003 are maximized quasi-peak detectors.

It can be seen from FIG. 3 that the plot 3001 showing levels of emitted radiation from the device 100 while charging also remains well below 40 dBμV/m over a frequency range of 30 MHz to 225 MHz and well below 47 dBμV/m over a frequency range of 235 MHz to 1 GHz. Furthermore, the plot 3001 remains below around 35 dBμV/m between a frequency of 30 MHz and around 500 MHz and below around 37.5 dBμV/m between the entire frequency range of 30 MHz to 1 GHz.

Figure 4:
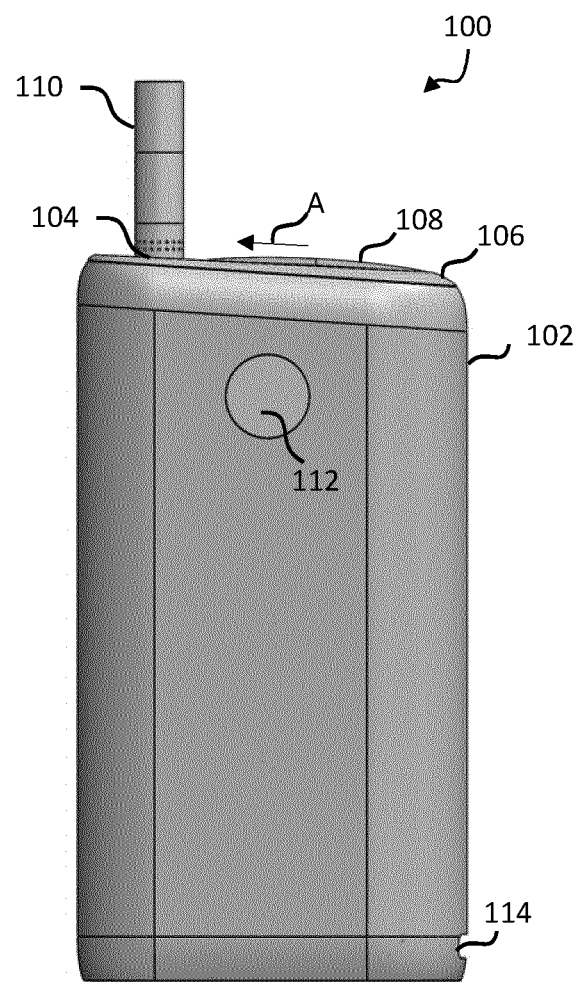
FIG. 4 shows a front view of an example aerosol generating device.

FIG. 4 shows an example of an aerosol generating device 100 for generating aerosol from an aerosol generating medium/material. In broad outline, the device 100 may be used to heat a replaceable article 110 comprising the aerosol generating medium, to generate an aerosol or other inhalable medium which is inhaled by a user of the device 100.

The device 100 comprises a housing 102 (in the form of an outer cover) which surrounds and houses various components of the device 100. The device 100 has an opening 104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 4, the lid 108 is shown in an open configuration, however the lid 108 may move into a closed configuration. For example, a user may cause the lid 108 to slide in the direction of arrow "A".

The device 100 may also include a user-operable control element 112, such as a button or switch, which operates the device 100 when pressed. For example, a user may turn on the device 100 by operating the switch 112.

Figure 5:
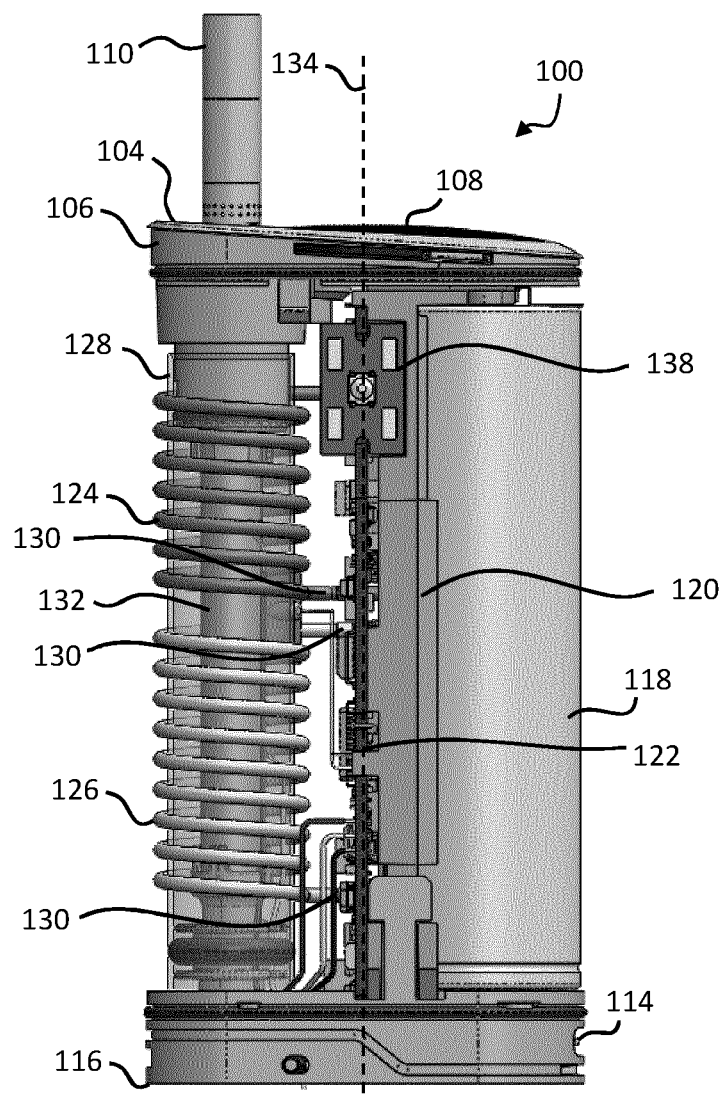
FIG. 5 shows a front view of the aerosol generating device of FIG. 4 with an outer cover removed.

The device 100 may also comprise an electrical component, such as a socket/port 114, which can receive a cable to charge a battery of the device 100. For example, the socket 114 may be a charging port, such as a USB charging port or specifically a USC-B charging port. FIG. 5 depicts the device 100 of FIG. 4 with the outer cover 102 removed. The device 100 defines a longitudinal axis 134.

As shown in FIG. 5, the first end member 106 is arranged at one end of the device 100 and a second end member 116 is arranged at an opposite end of the device 100. The first and second end members 106, 116 together at least partially define end surfaces of the device 100. For example, the bottom surface of the second end member 116 at least partially defines a bottom surface of the device 100. Edges of the outer cover 102 may also define a portion of the end surfaces. In this example, the lid 108 also defines a portion of a top surface of the device 100. FIG. 5 also shows a second printed circuit board 138 associated within the control element 112.

The end of the device closest to the opening 104 may be known as the proximal end (or mouth end) of the device 100 because, in use, it is closest to the mouth of the user. In use, a user inserts an article 110 into the opening 104, operates the user control 112 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows away from the distal end of the device 100.

The device 100 further comprises a power source 118. The power source 118 may be, for example, a battery, such as a rechargeable battery or a non-rechargeable battery. Examples of suitable batteries include, for example, a lithium battery (such as a lithium-ion battery), a nickel battery (such as a nickel-cadmium battery), and an alkaline battery. The battery is electrically coupled to the heating assembly to supply electrical power when required and under control of a controller (not shown) to heat the aerosol generating material. In this example, the battery is connected to a central support 120 which holds the battery 118 in place.

The device further comprises at least one electronics module 122. The electronics module 122 may comprise, for example, a printed circuit board (PCB). The PCB 122 may support at least one controller, such as a processor, and memory. The PCB 122 may also comprise one or more electrical tracks to electrically connect together various electronic components of the device 100. For example, the battery terminals may be electrically connected to the PCB 122 so that power can be distributed throughout the device 100. The socket 114 may also be electrically coupled to the battery via the electrical tracks.

In the example device 100, the heating assembly is an inductive heating assembly and comprises various components to heat the aerosol generating material of the article 110 via an inductive heating process. Induction heating is a process of heating an electrically conducting object (such as a susceptor) by electromagnetic induction. An induction heating assembly may comprise an inductive element, for example, one or more inductor coils, and a device for passing a varying electric current, such as an alternating electric current, through the inductive element. The varying electric current in the inductive element produces a varying magnetic field. The varying magnetic field penetrates a susceptor suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive heater and the susceptor, allowing for enhanced freedom in construction and application.

The induction heating assembly of the example device 100 comprises a susceptor arrangement 132 (herein referred to as "a susceptor"), a first inductor coil 124 and a second inductor coil 126. The first and second inductor coils 124, 126 are made from an electrically conducting material. In this example, the first and second inductor coils 124, 126 are made from Litz wire/cable which is wound in a helical fashion to provide helical inductor coils 124, 126. Litz wire comprises a plurality of individual wires which are individually insulated and are twisted together to form a single wire. Litz wires are designed to reduce the skin effect losses in a conductor. In the example device 100, the first and second inductor coils 124, 126 are made from copper Litz wire which has a substantially circular cross section. In other examples the Litz wire can have other shape cross sections, such as rectangular.

The first inductor coil 124 is configured to generate a first varying magnetic field for heating a first section of the susceptor 132 and the second inductor coil 126 is configured to generate a second varying magnetic field for heating a second section of the susceptor 132. Herein, the first section of the susceptor 132 is referred to as the first susceptor zone 132a and the second section of the susceptor 132 is referred to as the second susceptor zone 132b. In this example, the first inductor coil 124 is adjacent to the second inductor coil 126 in a direction along the longitudinal axis 134 of the device 100 (that is, the first and second inductor coils 124, 126 to not overlap). In this example the susceptor arrangement 132 comprises a single susceptor comprising two zones, however in other examples the susceptor arrangement 132 may comprise two or more separate susceptors. Ends 130 of the first and second inductor coils 124, 126 are connected to the PCB 122.

It will be appreciated that the first and second inductor coils 124, 126, in some examples, may have at least one characteristic different from each other. For example, the first inductor coil 124 may have at least one characteristic different from the second inductor coil 126. More specifically, in one example, the first inductor coil 124 may have a different value of inductance than the second inductor coil 126. In FIG. 5, the first and second inductor coils 124, 126 are of different lengths such that the first inductor coil 124 is wound over a smaller section of the susceptor 132 than the second inductor coil 126. Thus, the first inductor coil 124 may comprise a different number of turns than the second inductor coil 126 (assuming that the spacing between individual turns is substantially the same). In yet another example, the first inductor coil 124 may be made from a different material to the second inductor coil 126. In some examples, the first and second inductor coils 124, 126 may be substantially identical.

In this example, the inductor coils 124 126 are wound in the same direction as one another. That is, both the first inductor coil 124, and the second inductor coil 126 are left-hand helices. In another example, both inductor coils 124, 126 may be right-hand helices. In yet another example (not shown), the first inductor coil 124 and the second inductor coil 126 are wound in opposite directions. This can be useful when the inductor coils are active at different times. For example, initially, the first inductor coil 124 may be operating to heat a first section of the article 110, and at a later time, the second inductor coil 126 may be operating to heat a second section of the article 110. Winding the coils in opposite directions helps reduce the current induced in the inactive coil when used in conjunction with a particular type of control circuit. In one example where the coils 124, 126 are wound in different directions (not shown) the first inductor coil 124 may be a right-hand helix and the second inductor coil 126 may be a left-hand helix In another such embodiment, the first inductor coil 124 may be a left-hand helix and the second inductor coil 126 may be a right-hand helix.

The susceptor 132 of this example is hollow and therefore defines a receptacle within which aerosol generating material is received. For example, the article 110 can be inserted into the susceptor 132. In this example the susceptor 132 is tubular, with a circular cross section.

The device 100 of FIG. 5 further comprises an insulating member 128 which may be generally tubular and at least partially surround the susceptor 132. The insulating member 128 may be constructed from any insulating material, such as a plastics material for example. In this particular example, the insulating member is constructed from polyether ether ketone (PEEK). The insulating member 128 may help insulate the various components of the device 100 from the heat generated in the susceptor 132.

The insulating member 128 can also fully or partially support the first and second inductor coils 124, 126. For example, as shown in FIG. 5, the first and second inductor coils 124, 126 are positioned around the insulating member 128 and are in contact with a radially outward surface of the insulating member 128. In some examples the insulating member 128 does not abut the first and second inductor coils 124, 126. For example, a small gap may be present between the outer surface of the insulating member 128 and the inner surface of the first and second inductor coils 124, 126.

In a specific example, the susceptor 132, the insulating member 128, and the first and second inductor coils 124, 126 are coaxial around a central longitudinal axis of the susceptor 132.

Figure 6:
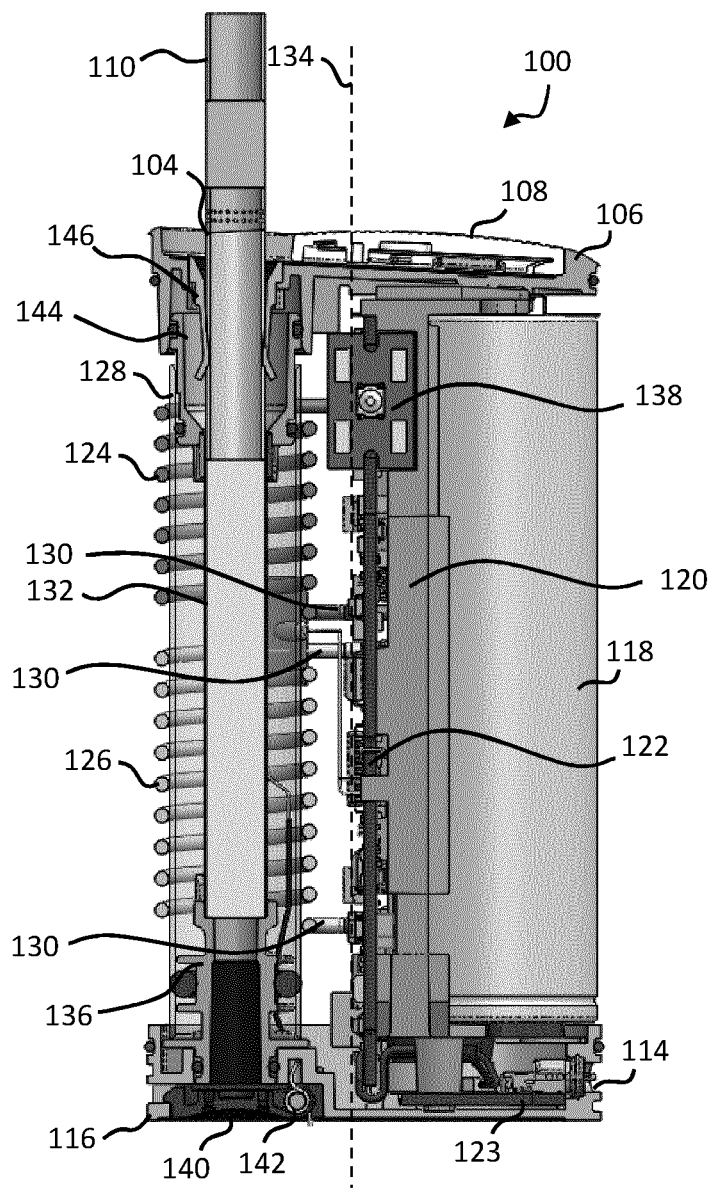
FIG. 6 shows a cross-sectional view of the aerosol generating device of FIG. 4.

FIG. 6 shows a side view of device 100 in partial cross-section. The outer cover 102 is again not present in this example. The circular cross-sectional shape of the first and second inductor coils 124, 126 is more clearly visible in FIG. 6.

The device 100 further comprises a support 136 which engages one end of the susceptor 132 to hold the susceptor 132 in place. The support 136 is connected to the second end member 116.

The device 100 further comprises a second lid/cap 140 and a spring 142, arranged towards the distal end of the device 100. The spring 142 allows the second lid 140 to be opened, to provide access to the susceptor 132. A user may, for example, open the second lid 140 to clean the susceptor 132 and/or the support 136.

The device 100 further comprises an expansion chamber 144 which extends away from a proximal end of the susceptor 132 towards the opening 104 of the device. Located at least partially within the expansion chamber 144 is a retention clip 146 to abut and hold the article 110 when received within the device 100. The expansion chamber 144 is connected to the end member 106.

FIG. 6 also shows a charging printed circuit board 123, which is located adjacent the socket 114 and may have located on it charging apparatus (an example of which is described below with reference to FIG. 16) for providing charging and power supply functionality for the device 100.

Figure 7:
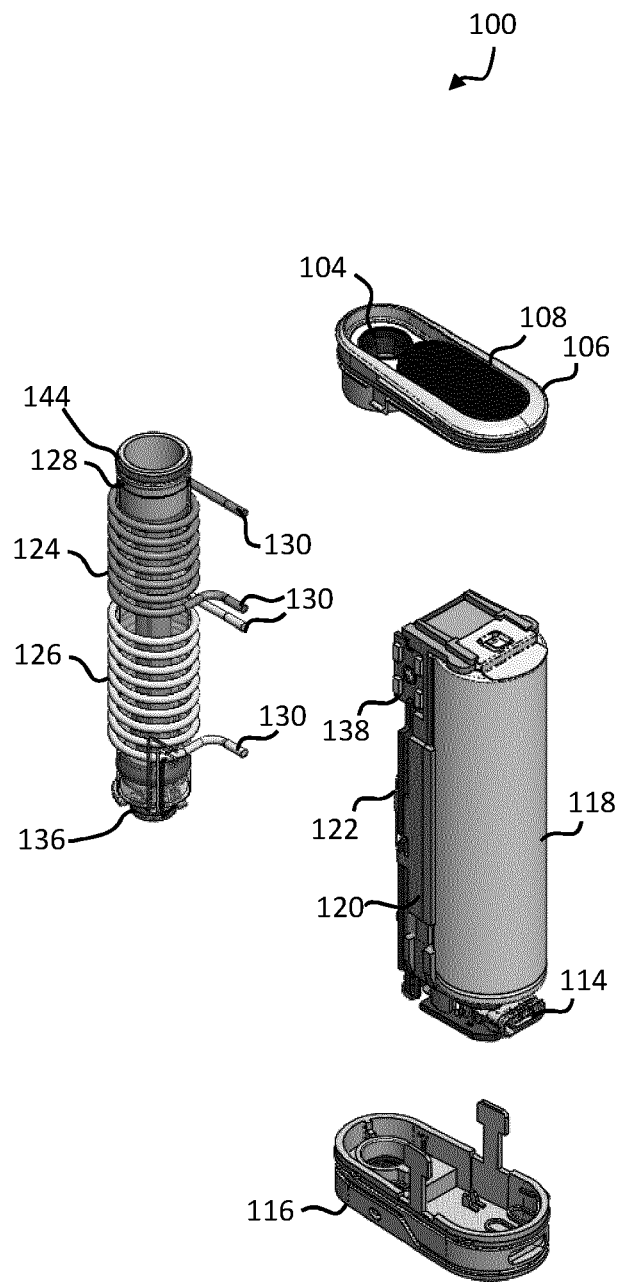
FIG. 7 shows an exploded view of the aerosol generating device of FIG. 4.

FIG. 7 is an exploded view of the device 100 of FIG. 4, with the outer cover 102 again omitted.

Figures 8A, 8B:
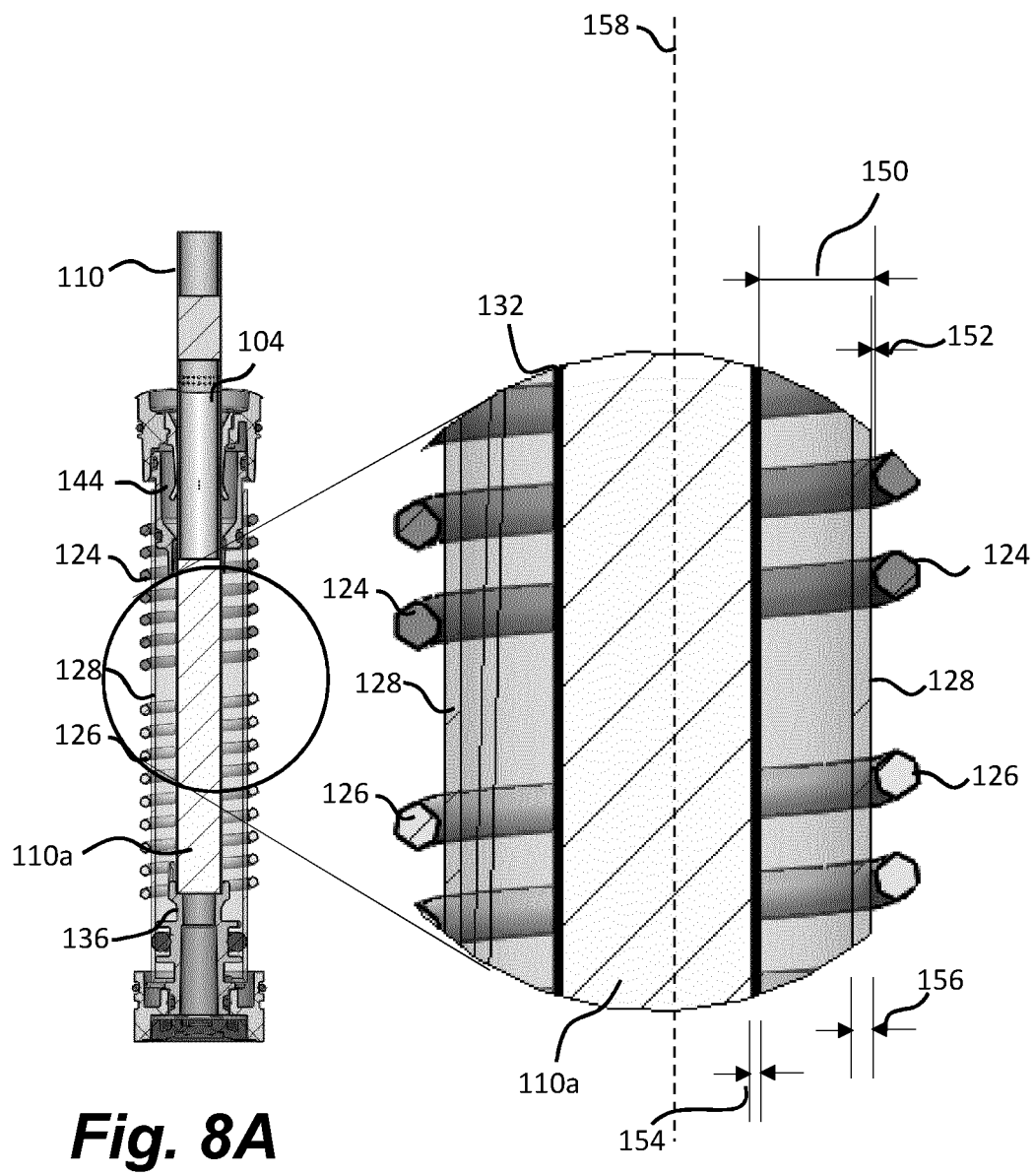
FIG. 8A shows a cross-sectional view of a heating assembly within an aerosol generating device.
FIG. 8B shows a close-up view of a portion of the heating assembly of FIG. 8A.

FIG. 8A depicts a cross section of a portion of the device 100 of FIG. 4. FIG. 8B depicts a close-up of a region of FIG. 8A. FIGS. 8A and 8B show the article 110 received within the susceptor 132, where the article 110 is dimensioned so that the outer surface of the article 110 abuts the inner surface of the susceptor 132. This ensures that the heating is most efficient. The article 110 of this example comprises aerosol generating material 110a. The aerosol generating material 110a is positioned within the susceptor 132. The article 110 may also comprise other components such as a filter, wrapping materials and/or a cooling structure.

FIG. 8B shows that the outer surface of the susceptor 132 is spaced apart from the inner surface of the inductor coils 124, 126 by a distance 150, measured in a direction perpendicular to a longitudinal axis 158 of the susceptor 132. In one particular example, the distance 150 is about 3 mm to 4 mm, about 3 mm to 3.5 mm, or about 3.25 mm.

FIG. 8B further shows that the outer surface of the insulating member 128 is spaced apart from the inner surface of the inductor coils 124, 126 by a distance 152, measured in a direction perpendicular to a longitudinal axis 158 of the susceptor 132. In one particular example, the distance 152 is about 0.05 mm. In another example, the distance 152 is substantially 0 mm, such that the inductor coils 124, 126 abut and touch the insulating member 128.

In one example, the susceptor 132 has a wall thickness 154 of about 0.025 mm to 1 mm, or about 0.05 mm.

In one example, the susceptor 132 has a length of about 40 mm to 60 mm, about 40 mm to 45 mm, or about 44.5 mm.

In one example, the insulating member 128 has a wall thickness 156 of about 0.25 mm to 2 mm, 0.25 mm to 1 mm, or about 0.5 mm.

Figure 9:
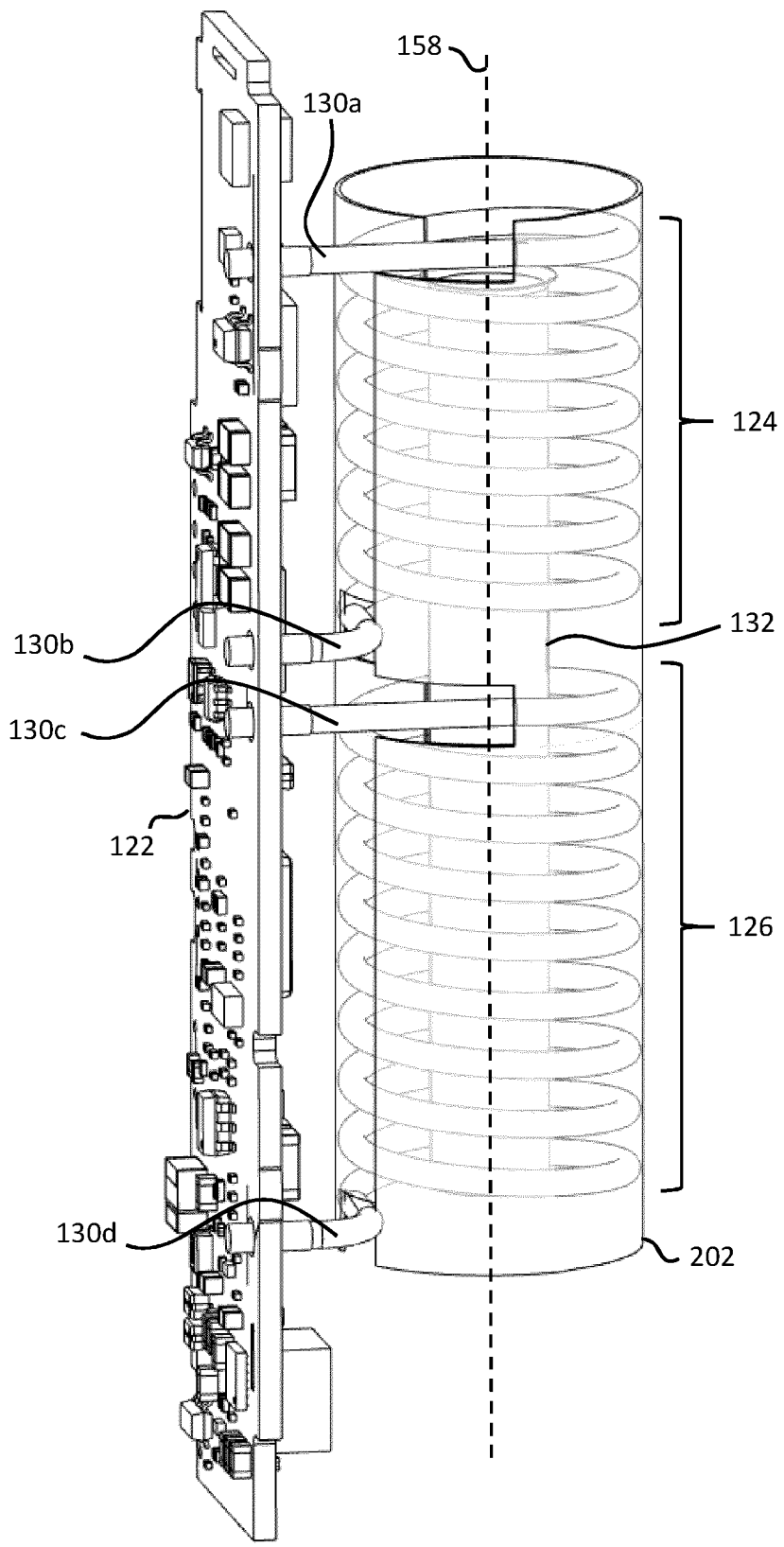
FIG. 9 shows a perspective view of an example magnetic shield member arranged within an aerosol generating device.

FIG. 9 depicts a perspective view of the printed circuit board, PCB, 122, the susceptor 132, the first inductor coil 124 and the second inductor coil 126. In this example the first and second inductor coils 124, 126 are made from wire having a circular cross-section. First and second ends 130a, 130b of the first inductor coil 124, are connected to the PCB 122. Similarly, first and second ends 130c, 130d of the second inductor coil 126 are connected to the PCB 122. In some examples, there may only be one inductor coil present.

Extending around the first and second inductor coils 124, 126 is a magnetic shield member 202. This magnetic shield member 202 is in contact with, and surrounds the first and second inductor coils 124, 126 to shield other components of the device 100 and/or other objects from electromagnetic radiation generated within the susceptor and/or first and second inductor coils 124, 126. The magnetic shield member 202 is illustrated as being transparent, to clearly show the inductor coils 124, 126 and the susceptor 132 arranged within the magnetic shield member 202. In this example, the magnetic shield member 202 is held in place via adhesive. In other examples, other features/components of the device 100 and or magnetic shield member 202 may hold the magnetic shield member 202 in place.

The susceptor 132 receives an article 110 and therefore defines a receptacle configured to receive aerosol generating material. In other examples (not shown) the susceptor 132 is part of the article 110, rather than the device 100, and so other components may define the receptacle. The receptacle/susceptor 132 defines an axis 158, such as a longitudinal axis 158, around which the magnetic shield member 202 is wrapped.

The magnetic shield member 202 comprises one or more components which acts as a shield against the electromagnetic radiation. In this example, the magnetic shield member 202 comprises a magnetic shielding layer, such as a ferrite layer, which acts as the shield.

The magnetic shield member 202 may comprise one or more further layers. For example, the magnetic shield member 202 may further comprise an adhesive layer and/or a laminate layer, as described in FIG. 10.

Figure 10:
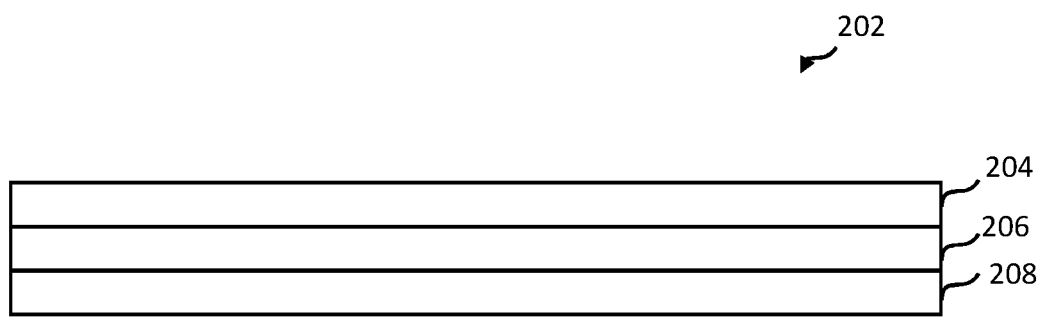
FIG. 10 shows a diagrammatic representation of a cross section of an example magnetic shield member.

FIG. 10 is a diagrammatic representation of a cross-section through an example magnetic shield member 202 before it is wrapped around the first and second inductor coils 123, 126. The magnetic shield member 202 is sheet-like.

In this example, the magnetic shield member 202 comprises at least three layers including a magnetic shielding layer 206, an adhesive layer 204 applied to a first side of the magnetic shielding layer 206, and a laminate layer 208 applied to a second side of the magnetic shielding layer 206.

The adhesive layer 204 is arranged on an inner surface of the magnetic shield member 202 so that the magnetic shield member 202 can be bonded to the first and second inductor coils 124, 126. An additional protective layer (not shown) may cover the adhesive layer 204, which is subsequently removed to expose the adhesive layer 204 before the magnetic shield member 202 is adhered to the first and second inductor coils 124, 126. The inner surface of the magnetic shield member 202 is the surface closest to the first and second inductor coils 124, 126 when the magnetic shield member 202 is in contact with the first and second inductor coils 124, 126. When the magnetic shield member 202 is wrapped around the first and second inductor coils 124, 126 the magnetic shield member may overlap itself in an overlapping region such that part of the adhesive layer 204 is in contact with the laminate layer 208.

The laminate layer 208 is arranged at, or towards an outer surface of the magnetic shield member 202. The outer surface of the magnetic shield member 202 is the surface which is furthest away from the first and second inductor coils 124, 126 when the magnetic shield member 202 is in contact with the first and second inductor coils 124, 126. In some examples, a further layer (not shown) forms the outer surface of the magnetic shield member 202.

As mentioned previously, ferrite material in the magnetic shielding layer 206 can crumble over many heating and cooling cycles. The laminate layer 208 acts to stop the crumbling material in the magnetic shielding layer 206 from coming loose and moving around inside the device 100. The laminate layer 208 may comprise a plastic material, and may be a plastic film, for example. In the present example, the plastic is Polyethylene terephthalate, PET. In the example of FIG. 10, the laminate layer 208 is directly adjacent to the magnetic shielding layer 208. For example, the laminate layer 208 may be bonded to the magnetic shielding layer 208 via heat sealing. In another example, a second adhesive layer (not shown) may be arranged between the laminate layer 208 and the magnetic shielding layer 206.

Figure 11:
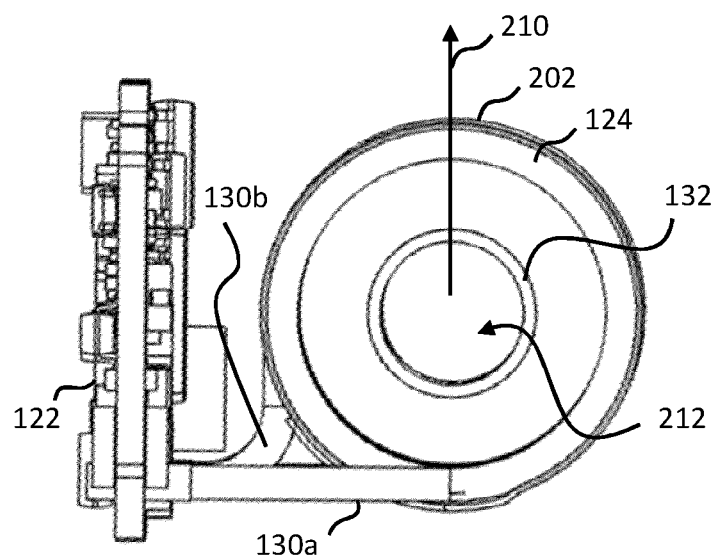
FIG. 11 shows a top-down view of the arrangement shown in FIG. 9.

FIG. 11 depicts a top-down view of the arrangement shown in FIG. 9. The receptacle 212, defined by the susceptor 132, receives the aerosol generating material therein. Arrow 210 indicates a radial direction, which points outwards from the receptacle/susceptor. When the magnetic shield member 202 of FIG. 10 is wrapped around the first and second inductor coils 124, 126, the laminate layer 208 is arranged further away from the first and second inductor coils 124, 126 in the radial direction 210 than the adhesive layer 204.

As shown in FIGS. 9 and 11, the first and second ends 130a, 130b of the first inductor coil 124 pass through notches/openings/apertures formed in the magnetic shield member 202. These notches allow the magnetic shield member 202 to more closely conform to the first and second inductor coils 124, 126.

Figure 12:
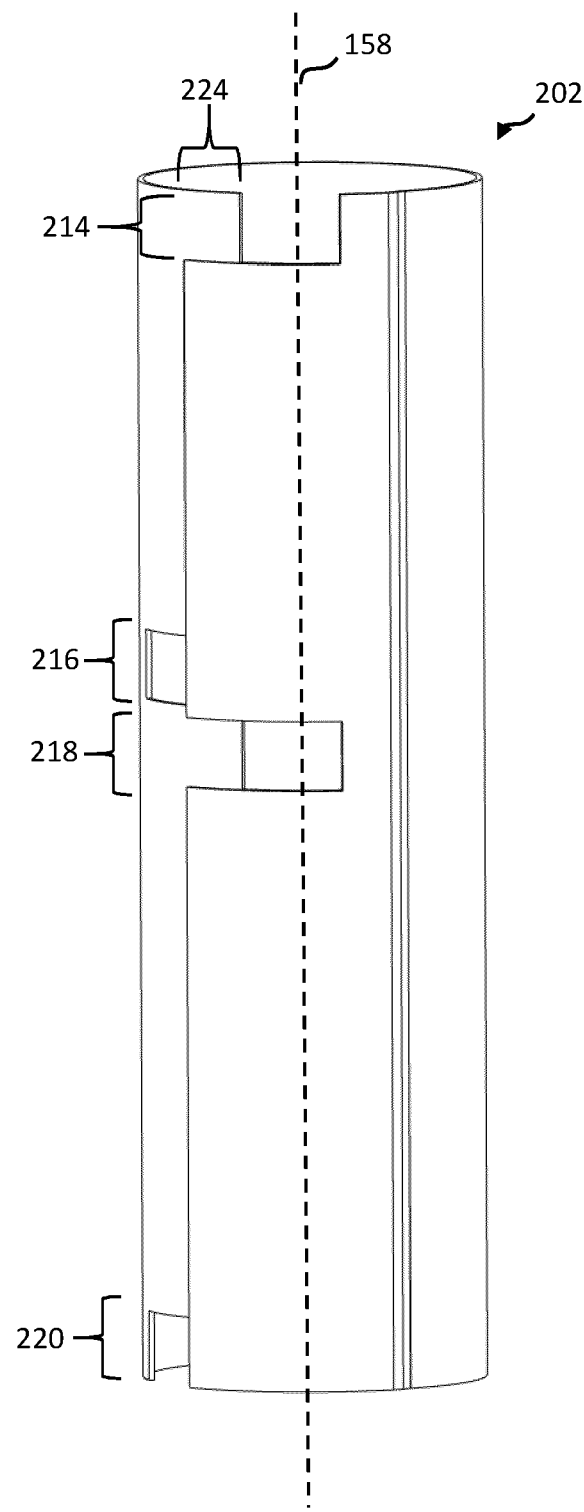
FIG. 12 shows a perspective view of an example magnetic shield member.

FIG. 12 depicts magnetic shield member 202 in isolation of the other components. The sheet-like magnetic shield member 202 is rolled into a cylindrical tube and overlaps in an overlapping region 224. The presence of the adhesive layer 204 means that the magnetic shield member 202 can be bonded to itself in the overlapping region 224 thereby providing an improved shield. In other examples the magnetic shield member 202 does not fully extend around the first and second inductor coils 124, 126.

The magnetic shield member 202 comprises four notches 214, 216, 218, 220. In other examples, there may be one or more notches present. The notches 214, 216, 218, 220 are formed at edges of the magnetic shield member 202 and each receives a section of wire forming the inductor coils 124, 126. The sections of wire include the first and second ends 130a, 130b, 130c, 130d of the first and second inductor coils 124, 126 as depicted in FIG. 9.

Figure 13:
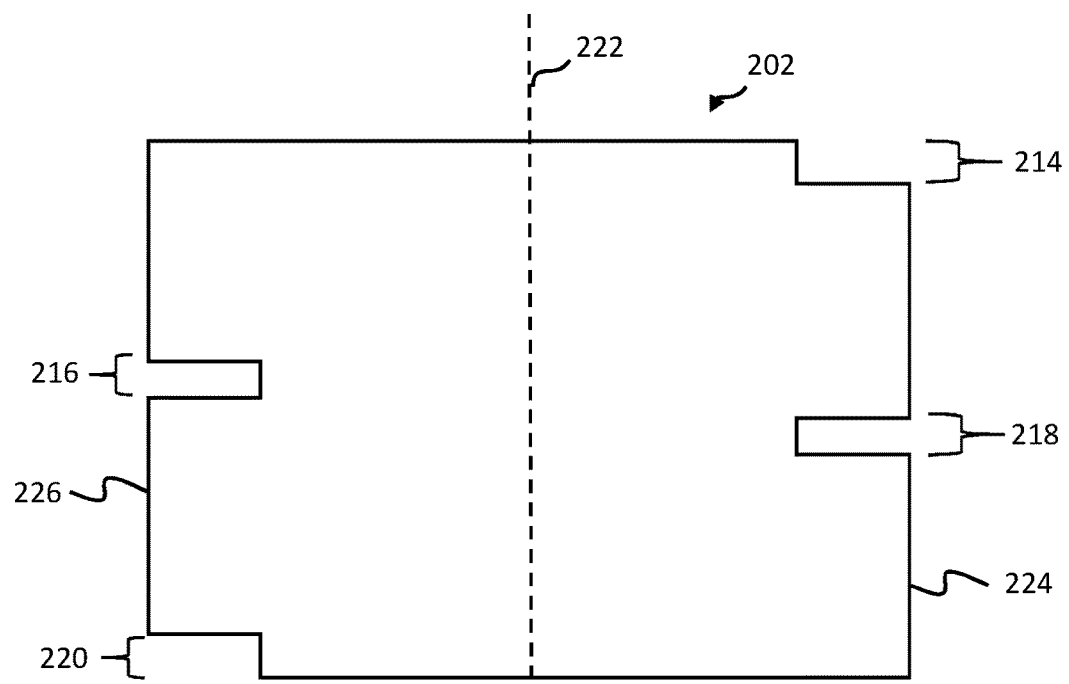
FIG. 13 shows a diagrammatic representation of a first example magnetic shield member comprising notches.

FIG. 13 is a diagrammatic representation of the magnetic shield member 202 of FIG. 12 before it is wrapped around the first and second inductor coils 124, 126. The magnetic shield member 202 is formed from a sheet that is generally rectangular. The sheet defines an axis 222 which is aligned parallel to an axis defined by the receptacle/susceptor 132 and an axis defined by the first and second inductor coils 124, 126 when the magnetic shield member 202 is wrapped around the inductor coils 124, 126.

The sheet comprises a first notch 214 formed at a first edge 224 of the sheet. The first notch 214 receives a section of wire forming the first inductor coil 124, where the section of wire includes the first end 130a. The sheet also comprises a second notch 218 formed at the first edge 224 of the sheet. The second notch 218 receives a section of wire forming the second inductor coil 126, where the section of wire includes the first end 130c. The sheet further comprises a third notch 216 formed at a second edge 226 of the sheet. The third notch 216 receives a second section of wire forming the first inductor coil 124, where the second section of wire includes the second end 130b. The sheet also comprises a fourth notch 220 formed at the second edge 226 of the sheet. The fourth notch 220 receives a second section of wire forming the second inductor coil 126, where the second section of wire includes the second end 130b. Thus, for each inductor coil there are two notches formed on opposite edges of the sheet.

The notches 214, 216, 218, 220 are all offset from each other in a direction along the axis 222 defined by the sheet (and are therefore all offset from each other in a direction along the longitudinal axis 158 defined by the susceptor 132 when the magnetic shield member 202 is in place).

Figure 14:
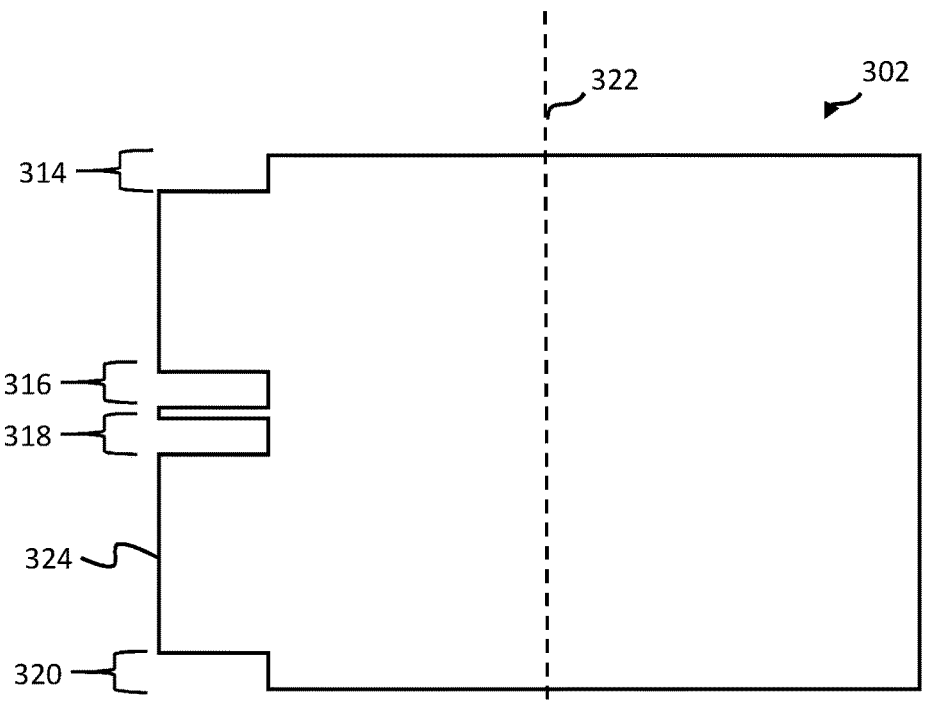
FIG. 14 shows a diagrammatic representation of a second example magnetic shield member comprising notches.

FIG. 14 is a diagrammatic representation of another example magnetic shield member 302 that could be used in the device 100. The magnetic shield member 302 is formed from a sheet that is generally rectangular. The sheet defines an axis 322 which is aligned parallel to an axis defined by the receptacle/susceptor 132 and an axis defined by the first and second inductor coils 124, 126 when the magnetic shield member 202 is wrapped around the inductor coils 124, 126.

Unlike the example of FIG. 13, the magnetic shield member 302 comprises notches formed along one edge of the sheet. For example, the sheet comprises a first notch 314 formed at a first edge 324 of the sheet. The first notch 314 receives a section of wire forming the first inductor coil 124, where the section of wire includes the first end 130a. The sheet also comprises a second notch 318 formed at the first edge 324 of the sheet. The second notch 318 receives a section of wire forming the second inductor coil 126, where the section of wire includes the first end 130c. The sheet further comprises a third notch 316 formed at the first edge 324 of the sheet. The third notch 316 receives a second section of wire forming the first inductor coil 124, where the second section of wire includes the second end 130b. The sheet also comprises a fourth notch 320 formed at the first edge 324 of the sheet. The fourth notch 320 receives a second section of wire forming the second inductor coil 126, where the second section of wire includes the second end 130b. Thus, for each inductor coil there are two notches formed at the same edge of the sheet.

The notches 314, 316, 318, 320 are all offset from each other in a direction along the axis 322 defined by the sheet (and are therefore all offset from each other in a direction along the longitudinal axis 158 defined by the susceptor 132 when the magnetic shield member 302 is in place).

Figure 15:
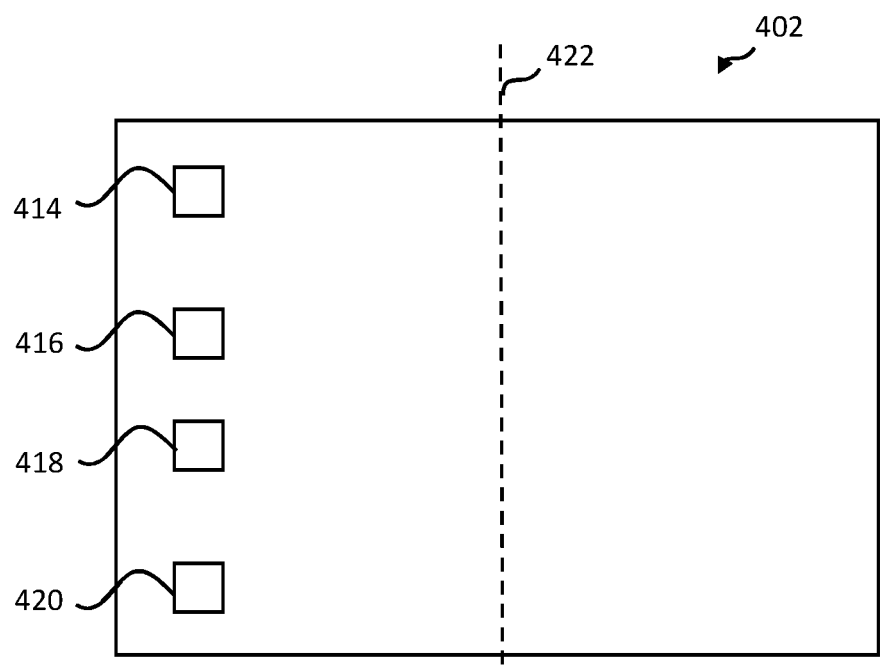
FIG. 15 shows a diagrammatic representation of a third example magnetic shield member comprising apertures.

FIG. 15 is a diagrammatic representation of another example magnetic shield member 402 that could be used in the device 100. The magnetic shield member 402 is formed from a sheet that is generally rectangular. The sheet defines an axis 422 which is aligned parallel to an axis defined by the receptacle/susceptor 132 and an axis defined by the first and second inductor coils 124, 126 when the magnetic shield member 202 is wrapped around the inductor coils 124, 126.

Unlike the example of FIGS. 13 and 14, the magnetic shield member 402 comprises openings/apertures/through holes formed in the sheet. Thus, ends of first and second inductor coils 124, 126 must first be passed through the apertures before being connected to the PCB 122.

The sheet comprises a first aperture 414 to receive a section of wire forming the first inductor coil 124, where the section of wire includes the first end 130a. The sheet also comprises a second aperture 418 to receive a section of wire forming the second inductor coil 126, where the section of wire includes the first end 130c. The sheet further comprises a third aperture 416 to receive a second section of wire forming the first inductor coil 124, where the second section of wire includes the second end 130b. The sheet also comprises a fourth aperture 420 to receive a second section of wire forming the second inductor coil 126, where the second section of wire includes the second end 130b.

The apertures 414, 416, 418, 420 are all offset from each other in a direction along the axis 422 defined by the sheet (and are therefore all offset from each other in a direction along the longitudinal axis 158 defined by the susceptor 132 when the magnetic shield member 302 is in place).

Figure 16:
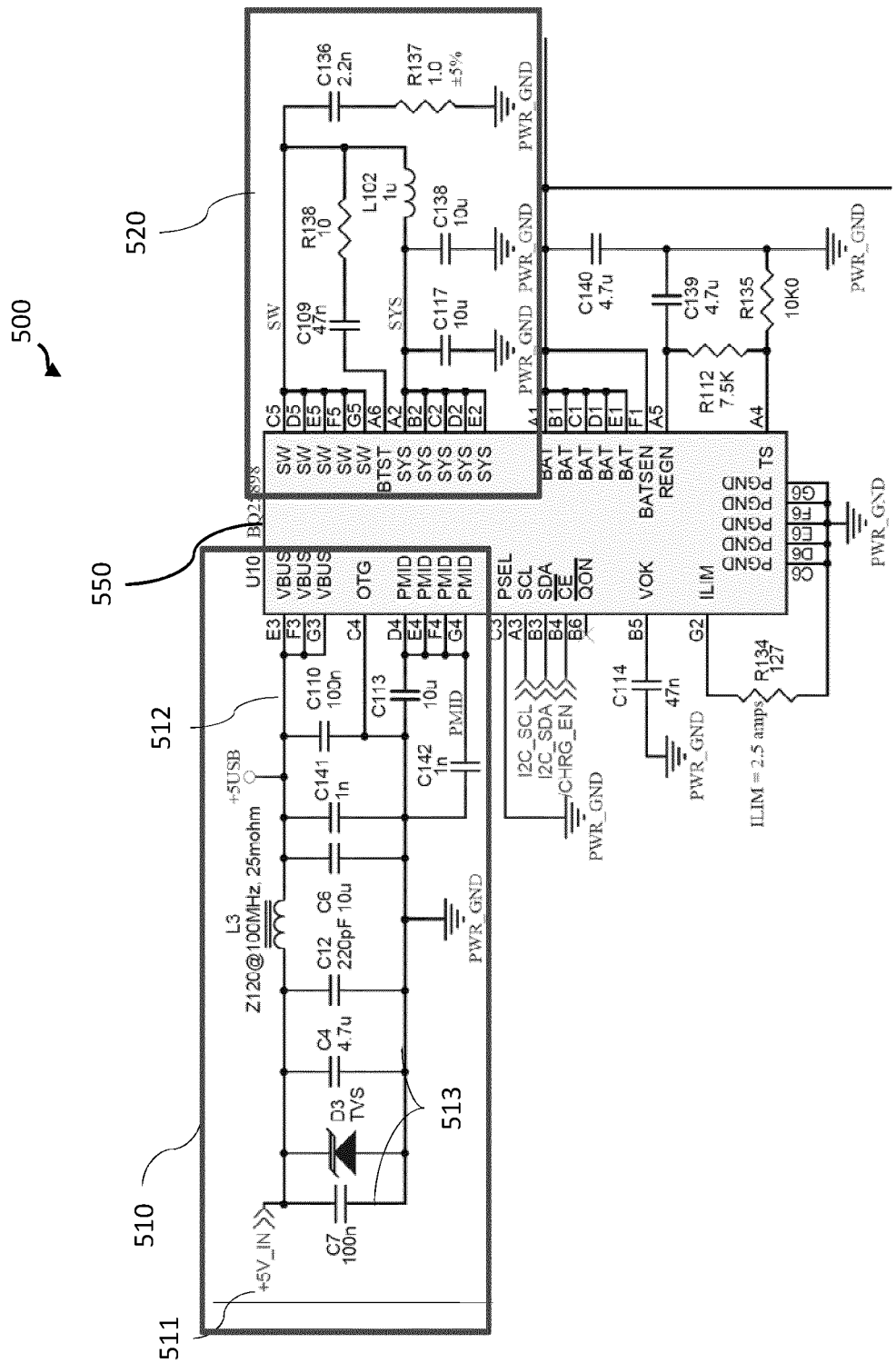
FIG. 16 shows a schematic representation of an example apparatus for controlling charging of the aerosol generating device.

FIG. 16 shows a schematic representation of an apparatus 500 of the aerosol generating device 100. The description of FIG. 16 herein will focus on certain features of the apparatus 500 which are configured to provide reduced emissions of electromagnetic radiation from the device 100. The apparatus 500 is housed in the device 100, and may in some examples be housed on the printed circuit board 123 adjacent the socket 114, and is for controlling charging of the battery 118 from an external power source (not shown). The apparatus 500 comprises a charge management device 550. The charge management device 550 of this example is a Texas Instruments bq25898 integrated circuit charge management and system power path management device, the general operation of which will be understood from the known specification of this integrated circuit device. The charge management device 550 is connected to the external power source by an input section 510. The apparatus 500 further comprises an output section 520 connected between terminals of the charge management device 550. In this example, the charge management device 550 also functions as a power management system to control the DC power supply supplied to other electrical components of the device 100. Therefore, the apparatus 500 may function as an interface between the external power source and the battery 118, and further may function as an interface between the battery 118 and the other electrical components of the device 100.

The apparatus 500 is configured to provide a level of emitted electromagnetic radiation from the device 100 while charging which allows the device to meet the levels of radiated electromagnetic emissions described above. The input section 510 and the output section 520 are configured to limit a level of electromagnetic radiation emanating from the apparatus 500 during charging of the device 100. In particular, the apparatus 500 is configured to limit spikes of emitted radiation during power cycling and switching operations performed by the charge management device 550 during charging.

The input section 510 of the charging apparatus 500 is configured to receive a 5V input 511 from the USB-C charging port 114. Connected between the input 511 and a first connection VBUS of the charge management device 550 via a first line 512 is an input inductor L3. The inductor L3 has an impedance of 120Ω+/−25% at 100 MHz and a DC resistance of 25 mΩ. The inductor L3 is selected to provide reduced emissions of electromagnetic radiation from the charging apparatus 500. The input inductor L3 is configured to provide a reduction in high frequency signals emanating from the apparatus 500. A reference signal +5USB is taken at a point on the first line 512 between the charge management device 550 and the input inductor L3. Further, the input section 510 comprises a second line 513 connected between the input 511 and a second connection PMID of the charge management device 550. On the second line 513, a 100 nF capacitor C7 is connected in series between the input 511 and ground. A 10 μF capacitor C113 and a 1 nF capacitor C142 are connected in parallel on the second line 513 between ground and the second connection PMID. Various capacitors C4, C12, C6, C141, C110 and a diode D3 are connected in parallel between the first line 512 and the second line 513. The arrangement of components defining the input section 510 act to reduce levels of electromagnetic radiation emitted by the apparatus 500. For example, the inductor L3 and various capacitors may provide a filtering effect to various frequency signals.

The output section 520 of the apparatus 500 is connected to a third connection SW, a fourth connection BTST and a fifth connection SYS of the charge management device 550. The third connection SW is a switching node which connects to an output inductor L102 of which is connected between the third connection SW and the fifth connection SYS. A 47 nF capacitor C109 and a 10Ω resistor are connected in series to the fourth connection BTST. Two 10 μF capacitors C117, C138 are connected in parallel between the fifth connection SYS and ground. The functions of the connections SW, SYS, BTST on the output section 520 of the bq25898 charge management controller 550 will be well understood, for example, from the technical specification documents of this controller as produced by Texas Instruments.

The output section 520 comprises a "snubber circuit" connected between the third connection SW and ground. The snubber circuit comprises a 2.2 nF capacitor C136 and an around 1Ω resistor R137 connected in series and acting to reduce, i.e. "snub", transient signals which may otherwise be picked up by the charge management device 550 and cause unwanted electromagnetic emissions. The inventors have found that the location of the snubber circuit comprising the capacitor C136 and R137 as shown in FIG. 16 allows for reduced electromagnetic emissions due to voltage spikes generated during switch charging operations in particular.

The layout of the components forming the apparatus 500 on the PCB 122 within the device 100 may also be configured to provide that levels of emitted electromagnetic radiation during charging are kept within levels described above. For example, the orientation of the inductor L102 on the PCB 122 is selected to limit said levels of emitted radiation while effective grounding of components is optimized to reduce electrical noise. Effective grounding may be achieved, for example, by providing a good contact area between particular components and the PCB 122.

In certain examples, the device 100, for example a controller (not shown) of the device 100, is configured to output rapidly varying voltage signals to control various functions of the device 100. For example, varying voltage signals at particular frequencies may be used to supply control functions to the induction heating circuit comprising the coils 124, 126. In some examples, these rapidly varying signals may be filtered to remove certain AC frequencies and thereby provide a signal which is substantially constant at a given frequency in order to provide a particular reference voltage for controlling a particular aspect of the induction circuit comprising the coils 124, 126, for example. For example, in one example, a filtered 20 kHz pulse-wave modulated signal may be filtered by appropriate filtering components, such as an arrangement of capacitors and resistors, to provide a reference voltage which is substantially constant at a lower frequency, such as 64 Hz. This reference voltage may be used to control aspects of induction circuitry for operating the inductors 124, 126. In some examples, the device is configured to limit peak levels of emitted electromagnetic radiation by leaving a portion of the higher frequency, e.g. 20 kHz, signal imposed on the lower frequency signal. This effect may be achieved by the appropriate selection of filtering components, such as capacitors and resistors, in certain examples. This can provide a spreading of the energy of the signal over a wider bandwidth and thus provide for lower electromagnetic emissions from the device 100 than if the higher frequency signal were filtered out more completely.

The above embodiments are to be understood as illustrative examples of the . . . . Further embodiments of the .are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aerosol generating device comprising:
   an induction heating circuit for inductively heating a susceptor arrangement to heat an aerosol generating material to thereby generate an aerosol;
   wherein the aerosol generating device is configured such that during operation a level of electromagnetic radiation emitted by the aerosol generating device is at least one of:
   less than 40 dBμV/m over a frequency range of 30 MHz to 225 MHz, less than 47 dBμV/m over a frequency range of 235 MHz to 1 GHz, less than 70 dBμV/m over a frequency range of 1 GHz to 3 GHZ, or less than 74 dBμV/m over a frequency range of 3 GHz to 6 GHZ,
   wherein the aerosol generating device comprises a magnetic shield member configured to extend at least partially around the induction heating circuit or the susceptor arrangement.

2. The aerosol generating device according to claim 1, wherein the aerosol generating device is configured such that during operation the level of electromagnetic radiation emitted due to the operation of the aerosol generating device is less than 40 dBμV/m over a frequency range of 30 MHz to 225 MHz and less than 47 dBμV/m over a frequency range of 235 MHz to 1 GHz.

3. The aerosol generating device according to claim 1, wherein the aerosol generating device is configured such that during operation to charge the aerosol generating device or during operation to discharge the aerosol generating device the level of electromagnetic radiation emitted due to the operation of the aerosol generating device is at least one of:
   less than 40 dBμV/m over a frequency range of 30 MHz to 225 MHz, less than 47 dBμV/m over a frequency range of 235 MHz to 1 GHz, less than 70 dBμV/m over a frequency range of 1 GHz to 3 GHz, or less than 74 dBμV/m over a frequency range of 3 GHz to 6 GHz.

4. The aerosol generating device according to claim 1, wherein the level of radiation emitted by the aerosol generating device is a level of emitted radiation as measured in both a vertical plane and in a horizontal plane.

5. The aerosol generating device according to claim 1, wherein at least one of:
   the level of electromagnetic radiation emitted by the aerosol generating device is the level of electromagnetic radiation as measured using a testing setup for measuring levels of emitted electromagnetic radiation, or
   the level of emitted radiation emitted by the aerosol generating device is a level determined by measuring peak or quasi-peak levels of radiation emitted by the aerosol generating device.

6. The aerosol generating device according to claim 1, wherein the aerosol generating device comprises the susceptor arrangement and during operation the aerosol generating material is received by the aerosol generating device such that the susceptor arrangement is arranged to heat the aerosol generating material.

7. The aerosol generating device according to claim 1, wherein the aerosol generating device is a tobacco heating device configured to, during operation, heat but not burn tobacco material to generate an aerosol therefrom.

8. The aerosol generating device according to claim 1, wherein the aerosol generating device is a handheld aerosol generating device.

9. The aerosol generating device according to claim 1, wherein the induction heating circuit comprises an inductive element configured to generate a varying magnetic field for heating the susceptor arrangement, and wherein the magnetic shield member is configured to extend at least partially around the inductive element.

10. The aerosol generating device according to claim 1, wherein the aerosol generating device comprises a receptacle configured to receive during operation the aerosol generating material to be heated by the susceptor arrangement, and wherein the inductive element is an inductor coil extending around the receptacle.

11. The aerosol generating device according to claim 10, wherein the receptacle is defined by the susceptor arrangement.

12. The aerosol generating device according to claim 1, wherein the magnetic shield member surrounds the inductive element and the magnetic shield member is at least partially bonded to itself.

13. The aerosol generating device according to claim 1, further comprising a charging apparatus configured to control charging of a battery of the aerosol generating device from a power source external to the aerosol generating device, wherein the charging apparatus is configured such that, when operating to manage charging of the aerosol generating device, peak levels in electromagnetic radiation emitted by the aerosol generating device due to operation of the charging apparatus are at least one of:
   less than 40 dBμV/m over a frequency range of 30 MHz to 225 MHz, less than 47 dBμV/m over a frequency range of 235 MHz to 1 GHz, less than 70 dBμV/m over a frequency range of 1 GHz to 3 GHz, or less than 74 dBμV/m over a frequency range of 3 GHz to 6 GHz.

14. The aerosol generating device according to claim 13, wherein the charging apparatus is configured to perform switching operations during charging, and wherein the charging apparatus comprises a snubber circuit for limiting a rate of change of voltage during the switching operations of the charging apparatus.

15. The aerosol generating device according to claim 14, wherein the charging apparatus comprises:

an input section configured for connecting to the external power source to receive power therefrom to charge the aerosol generating device;
an output section connected to an output inductor; and
a charge management controller connected between the input section and the output section and configured to receive power from the input section and control a current supplied to the output section.

16. The aerosol generating device according to claim 15, wherein the snubber circuit is located in the output section of the charging apparatus.

17. The aerosol generating device according to claim 15, wherein the input section of the charging apparatus comprises an input inductor for filtering high frequency signals reaching the charge management controller.

18. The aerosol generating device according to claim 1, wherein the aerosol generating device is configured such that during operation to heat an aerosolizable material a level of electromagnetic radiation emitted by the aerosol generating device over a frequency range of 30 MHz to 1 GHz is less than around 35 dBµV/m.

19. The aerosol generating device according to claim 1, wherein the aerosol generating device is configured such that during operation to heat an aerosolizable material a level of electromagnetic radiation emitted by the aerosol generating device over a frequency range of 30 MHz to 400 MHz is less than around 20 dBµV/m.

20. The aerosol generating device according to claim 1, wherein the aerosol generating device is configured such that during operation to charge the aerosol generating device a level of electromagnetic radiation emitted by the device over a frequency range of 300 MHz to 1 GHz is less than around 37.5 dBµV/m.

21. The aerosol generating device according to claim 1, wherein the aerosol generating device is configured such that during operation to charge the aerosol generating device a level of electromagnetic radiation emitted by the device over a frequency range of 30 MHz to 500 MHz is less than around 35 dBµV/m.

22. The aerosol generating device according to claim 1, wherein the aerosol generating device is configured such that at least one of:
an average emitted radiation level for the aerosol generating device during operation over a frequency range of 1 GHz to 3 GHz is less than around 50 dBµV/m, or
an average emitted radiation level for the aerosol generating device during operation over a frequency range of 3 GHz to 6 GHz is less than around 54 dBµV/m.

23. A system comprising the aerosol generating device according to claim 1, and a charging cable for providing charge from an external power source to charge the aerosol generating device,
wherein the system is configured such that during operation to charge the aerosol generating device a level of electromagnetic radiation emitted by the system is at least one of:
less than 40 dBµV/m over a frequency range of 30 MHz to 225 MHz, less than 47 dBµV/m over a frequency range of 235 MHz to 1 GHz, less than 70 dBµV/m over a frequency range of 1 GHz to 3 GHZ, or less than 74 dBµV/m over a frequency range of 3 GHz to 6 GHz.

24. The system according to claim 23, wherein the system is configured such that during operation to charge the aerosol generating device a level of electromagnetic radiation emitted by the system over a frequency range of 300 MHz to 1 GHz is less than around 37.5 dBµV/m.

25. The system according to claim 23, wherein the system is configured such that during operation to charge the aerosol generating device a level of conducted electromagnetic emissions on the charging cable due to operation of the device is at least one of:
less than around 66 dBµV over a frequency range of 150 kHz to 500 kHz;
less than around 56 dBµV at around 500 kHz;
less than around 56 dBµV over a frequency range of 500 kHz to 5 MHz; or
less than around 60 dBµV over a frequency range of 5 MHz to 30 MHz.

26. An aerosol generating system comprising the aerosol generating device according to claim 1 and an article containing an aerosolizable material,
wherein the system is configured such that during operation to generate an aerosol from the aerosolizable material a level of electromagnetic radiation emitted by the system is at least one of:
less than 40 dBµV/m over a frequency range of 30 MHz to 225 MHz, less than 47 dBµV/m over a frequency range of 235 MHz to 1 GHz, less than 70 dBµV/m over a frequency range of 1 GHz to 3 GHZ, or less than 74 dBµV/m over a frequency range of 3 GHz to 6 GHz.

27. The aerosol generating system according to claim 26, wherein the system is configured such that during operation to generate an aerosol from the aerosolizable material a level of electromagnetic radiation emitted by the system is less than around 35 dBµV/m over a frequency range of 30 MHz to 500 MHz.

28. The aerosol generating system according to claim 27, wherein the system is configured such that during operation to generate an aerosol from the aerosolizable material a level of electromagnetic radiation emitted by the system over a frequency range of 30 MHz to 400 MHz is less than around 20 dBµV/m.

* * * * *